US011853407B2

(12) United States Patent
Siebels et al.

(10) Patent No.: US 11,853,407 B2
(45) Date of Patent: Dec. 26, 2023

(54) PROTECTED ARTICLE MANAGEMENT

(71) Applicant: Siebels Asset Management Research Ltd., Nassau (BS)

(72) Inventors: Jane Marie Siebels, Nassau (BS); Jeffrey Guy Bonar, Brooklyn, NY (US); Karl Ginter, Beltsville, MD (US); John Langley Rehwinkel, Lovettsville, VA (US); Derek S. Toledo-Silbert, Brooklyn, NY (US)

(73) Assignee: Homer Technology Holdings (Bahamas), Ltd., Nassau (BS)

( * ) Notice: Subject to any disclaimer, the term of this patent is extended or adjusted under 35 U.S.C. 154(b) by 0 days.

(21) Appl. No.: 17/901,689

(22) Filed: Sep. 1, 2022

(65) Prior Publication Data

US 2023/0004633 A1    Jan. 5, 2023

Related U.S. Application Data

(60) Continuation of application No. 16/821,363, filed on Mar. 17, 2020, now Pat. No. 11,449,593, which is a
(Continued)

(51) Int. Cl.
*G06F 21/35* (2013.01)
*H04W 4/70* (2018.01)
(Continued)

(52) U.S. Cl.
CPC .............. *G06F 21/35* (2013.01); *G06F 21/31* (2013.01); *G06F 21/44* (2013.01); *G06F 21/88* (2013.01);
(Continued)

(58) Field of Classification Search
CPC .......... G06F 21/35; G06F 21/44; G06F 21/88; G06F 2221/2129; H04W 12/069;
(Continued)

(56) References Cited

U.S. PATENT DOCUMENTS 7,249,108 B1 *   7/2007   Walmsley ............. H04L 9/0662
                                                          713/168
7,280,044 B2 *  10/2007   Kubby ............. G06K 19/07758
                                                          340/572.1
(Continued)

FOREIGN PATENT DOCUMENTS

CN          101516635 A       8/2009
CN          102502065 A       6/2012
(Continued)

OTHER PUBLICATIONS

EPO Communication for EP 16 723 561.3-1207, dated May 15, 2020.
(Continued)

*Primary Examiner* — Nam V Nguyen

(57) ABSTRACT

Tracking, identifying and article management systems and methods for reliably and repeatedly determining one or more physically uncopiable attribute instances (of the same or varying types) from or inherent in an article of manufacture, using the selected physical uncopiable attribute(s) to produce an unforgeable identity for the article, and then integrating that unforgeable identity into computer-based tracking systems in a way that permits the tracking system to track and monitor articles for which identity information is known. Applications include documents, fashion accessories, artwork, and other objects.

20 Claims, 24 Drawing Sheets

Related U.S. Application Data division of application No. 15/977,862, filed on May 11, 2018, now Pat. No. 10,636,232, which is a division of application No. 15/130,641, filed on Apr. 15, 2016, now Pat. No. 9,996,996.

(60) Provisional application No. 62/285,018, filed on Apr. 14, 2016, provisional application No. 62/295,914, filed on Feb. 16, 2016, provisional application No. 62/148,528, filed on Apr. 16, 2015.

(51) Int. Cl.
| | | |
|---|---|---|
| *H04L 9/32* | (2006.01) | |
| *G06F 21/31* | (2013.01) | |
| *G06F 21/44* | (2013.01) | |
| *G06F 21/88* | (2013.01) | |
| *G07C 9/28* | (2020.01) | |
| *H04W 12/069* | (2021.01) | |
| *G08B 25/10* | (2006.01) | |
| *G07C 9/00* | (2020.01) | |

(52) U.S. Cl.
CPC ............. *G07C 9/28* (2020.01); *H04L 9/3271* (2013.01); *H04L 9/3278* (2013.01); *H04W 4/70* (2018.02); *H04W 12/069* (2021.01); *G06F 2221/2129* (2013.01); *G07C 2009/00412* (2013.01); *G08B 25/10* (2013.01); *H04L 2209/12* (2013.01); *H04L 2209/805* (2013.01)

(58) Field of Classification Search
CPC ............ G07C 9/28; G07C 2009/00412; H04L 2209/12; H04L 2209/805; H03K 19/23
USPC .................................................. 340/5.32, 5.3
See application file for complete search history.

(56) References Cited

U.S. PATENT DOCUMENTS

| | | | | |
|---|---|---|---|---|
| 8,782,396 B2* | 7/2014 | Ziola | ................... | H04W 12/062 |
| | | | | 713/155 |
| 8,856,533 B2* | 10/2014 | Schrijen | ................. | G06F 21/60 |
| | | | | 713/176 |
| 8,918,647 B1 | 12/2014 | Wallrabenstein | | |
| 9,041,540 B2* | 5/2015 | An | ..................... | G08B 13/2465 |
| | | | | 340/572.3 |
| 9,058,554 B2* | 6/2015 | Kervinen | ................. | D06H 1/04 |
| 9,946,858 B2* | 4/2018 | Wallrabenstein | ....... | G06F 21/31 |
| 9,959,430 B2* | 5/2018 | Hamilton | ................ | G06F 21/73 |
| 9,996,480 B2 | 6/2018 | Walsh | | |
| 9,996,996 B2* | 6/2018 | Siebels | ............... | H04W 12/069 |
| 10,107,855 B1 | 10/2018 | Corbett | | |
| 10,374,812 B2* | 8/2019 | Schepers | ............... | H04L 9/3278 |
| 10,502,777 B2 | 12/2019 | Bacher | | |
| 10,636,232 B2* | 4/2020 | Siebels | ................. | H04L 9/3278 |
| 10,650,203 B1* | 5/2020 | Yamamoto | ......... | G06K 7/10366 |
| 10,742,221 B2 | 8/2020 | Usuda | | |
| 11,449,593 B2* | 9/2022 | Siebels | ............... | H04W 12/069 |
| 2003/0204743 A1* | 10/2003 | Devadas | ................. | G06F 21/72 |
| | | | | 257/E23.179 |
| 2007/0146141 A1 | 6/2007 | Popplewell et al. | | |
| 2007/0247317 A1 | 10/2007 | Farrell | | |
| 2009/0083833 A1 | 3/2009 | Ziola et al. | | |
| 2009/0265758 A1* | 10/2009 | Tuyls | ...................... | G07F 7/086 |
| | | | | 726/2 |
| 2011/0285507 A1* | 11/2011 | Nelson | ............... | G06K 19/0739 |
| | | | | 340/10.1 |
| 2013/0108145 A1* | 5/2013 | Cobb | .................... | G06T 1/0021 |
| | | | | 382/141 |
| 2013/0147511 A1* | 6/2013 | Koeberl | ................ | H04L 9/3278 |
| | | | | 326/8 |
| 2014/0042442 A1* | 2/2014 | Bruley | .................... | G06F 21/73 |
| | | | | 257/E21.531 |
| 2018/0145838 A1 | 5/2018 | Wang | | |
| 2018/0183613 A1 | 6/2018 | Dafali | | |

FOREIGN PATENT DOCUMENTS

| | | | | |
|---|---|---|---|---|
| EP | 2998950 A1 * | 3/2016 | ............ | G02B 21/06 |
| WO | 2008/009743 A2 | 1/2008 | | |
| WO | WO-2016024037 A1 * | 2/2016 | ............ | B82Y 10/00 |

OTHER PUBLICATIONS

Tuyls P., Škorić B. (2007) Strong Authentication with Physical Unclonable Functions. In: Petković M., Jonker W. (eds) Security, Privacy, and Trust in Modern Data Management. Data-Centric Systems and Applications. Springer, Berlin, Heidelberg, pp. 133-147.

International Search Report and Written Opinion of the International Searching Authority dated Jul. 15, 2016, issued In related application PCT/US2016/027834.

IPRP and Written Opinion of the International Searching Authority dated Oct. 26, 2017, issued in related application PCT/US2016/027834.

Examination Report for corresponding AU 2016248323, dated Dec. 18, 2019, 4pgs.

Notification of First Chinese Office Action for corresponding CN201680035436.1, dated Jun. 16, 2020.

* cited by examiner

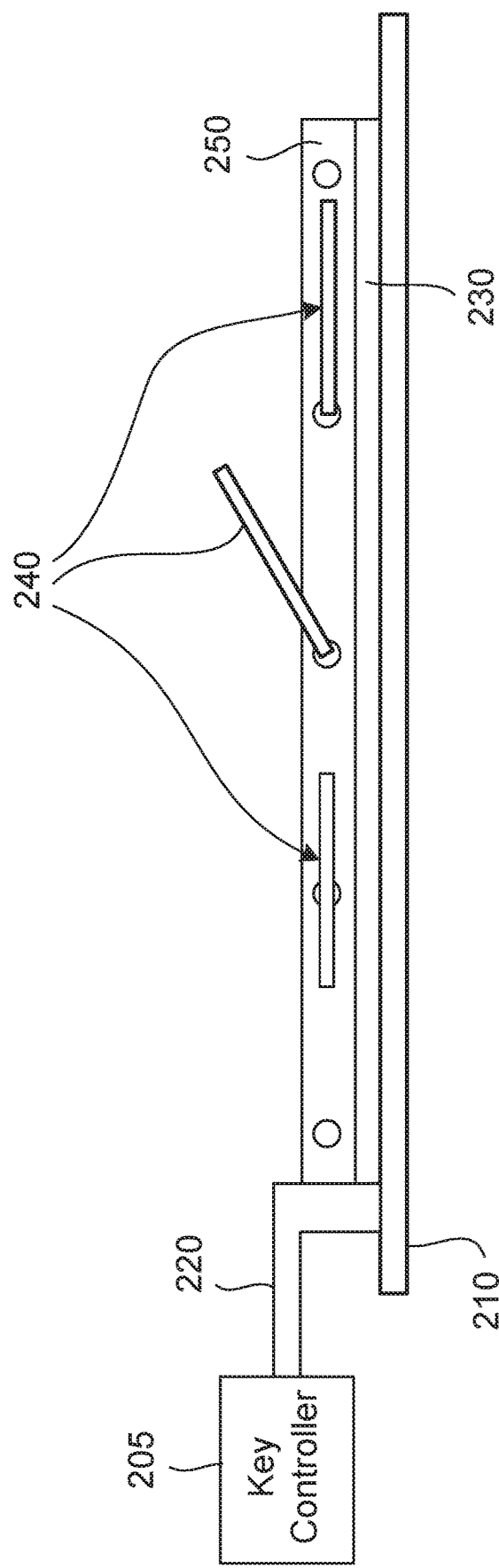

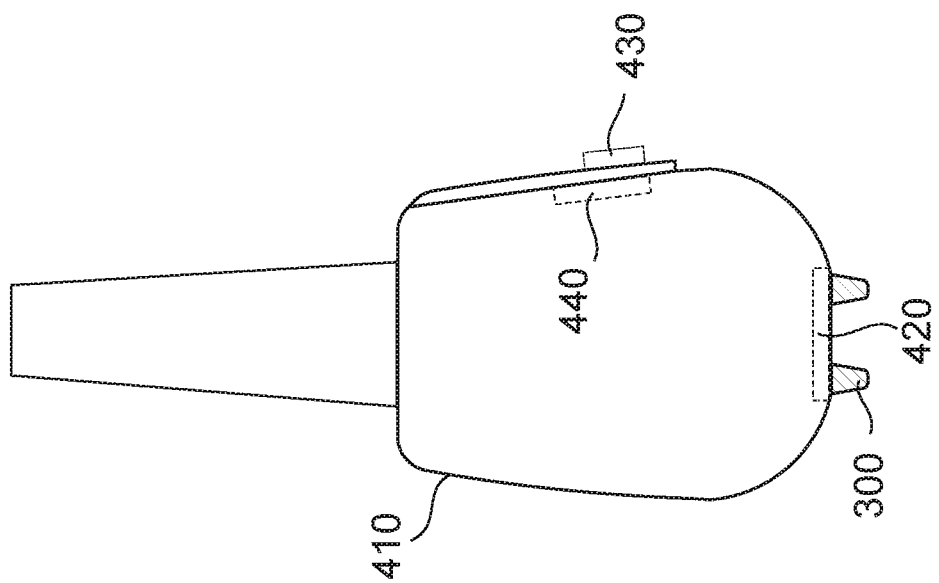
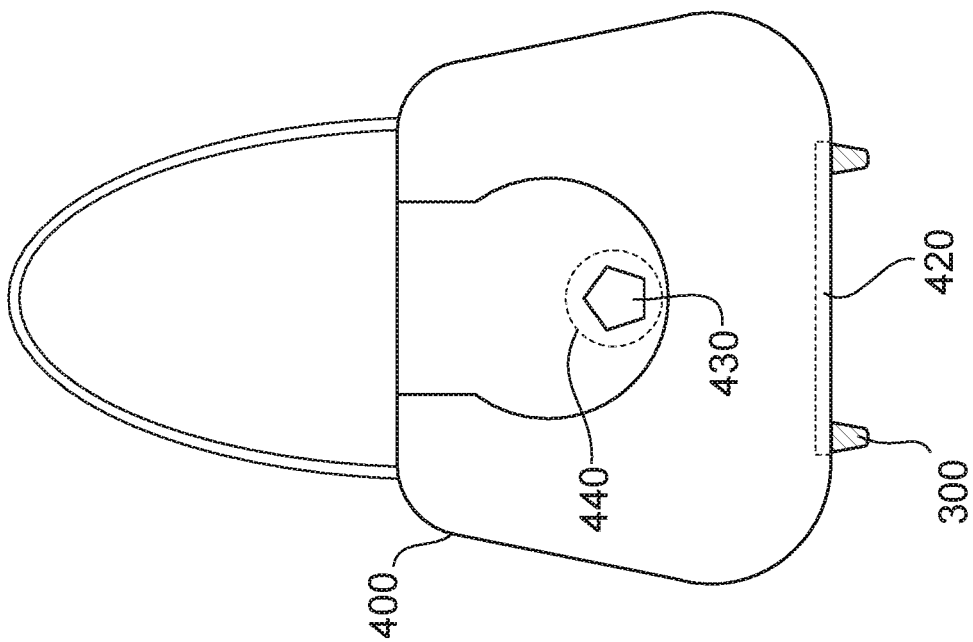
FIG. 5A
FIG. 5B

PROTECTED ARTICLE MANAGEMENT

CROSS-REFERENCE TO RELATED APPLICATIONS

This application is a continuation of U.S. patent application Ser. No. 16/821,363, filed Mar. 17, 2020 (now U.S. Pat. No. 11,449,593), which is a division of U.S. patent application Ser. No. 15/977,862, filed May 11, 2018 (now U.S. Pat. No. 10,636,232), which is a division of U.S. patent application Ser. No. 15/130,641 filed Apr. 15, 2016 (now U.S. Pat. No. 9,996,996), which claims benefit of U.S. Provisional Application Nos. 62/148,528 filed Apr. 16, 2015, 62/295,914 filed Feb. 16, 2016, and 62/285,018 filed Apr. 14, 2016. The disclosures of these applications are incorporated herein in their entirety by reference.

STATEMENT REGARDING FEDERALLY SPONSORED RESEARCH OR DEVELOPMENT

None.

FIELD

This technology relates to binding an electronic identity with an article of manufacture, and to effective tracking and protection of articles of interest. Example non-limiting technology herein further relates to tracking and authentication systems that use article physically uncopiable attributes (PUAs) that permit repeatable extraction of a useful subset of PUAs and the real-time use of such extracted PUA information to determine integrity and authenticity of articles and associated tracking systems and devices.

BACKGROUND

Many in the past have attempted to protect high value articles from loss, theft, and forgery. For example, luxury goods such as purses and accessories, clothing, artwork, original documents and instruments, and related items can be lost or stolen and sometimes even forged or counterfeited. Some past solutions have used combinations of anti-theft technologies, assured provenance, and product identification technologies.

Anti-theft technologies include resonance tags, NFC chips or tags and RFID tags affixed to or embedded in the articles to be protected. Since these technologies are removable by skilled thieves, they suffer from "tag swapping", where the tags are taken from one article and affixed to another article in order to enable theft and counterfeiting. Such tags typically report their presence without regard to whether the tag is still associated with the original article the tag was intended to identify.

Assured provenance involves affixing a unique serial number or other product or item identifier to an article, either physically or electronically, that is tied to manufacturer-provided provenance information. The unique serial number or other ID, in digital and/or mechanical form, can be forged, permitting counterfeit item distribution. A manufacturer's database of "authentic" items generally does not provide public visibility into the current status of an article, so a resale business generally has no means to determine whether an article has been tampered with or is even authentic.

Biometrics (a form of people-based attributes thought to be highly individualized, such as fingerprints or retinal scans) have been traditionally used in secure systems to "unlock" repositories of digital secrets (e.g. cryptographic keys). Such biometric information is sometimes used by the digital system to grant access and/or protect the integrity of other parts of the system. Some such schemes in the past had weaknesses around spoofing of the biometric information, the false positive/negative rate of the reader (e.g. reliability), and/or integrity of underlying device. Fingerprint and other biometric readers have also proven to be straightforward to spoof or hack in the past.

BRIEF DESCRIPTION OF THE DRAWINGS

The following detailed description of exemplary non-limiting illustrative embodiments is to be read in conjunction with the drawings of which:

FIG. 3A illustrates a side view of an exemplary resistive mesh key.

FIGS. 5A, 5B illustrate a front and side view of exemplary implementation of resistive mesh keys within a protected article.

DETAILED DESCRIPTION OF EXAMPLE NON-LIMITING EMBODIMENTS

Figure 1A:
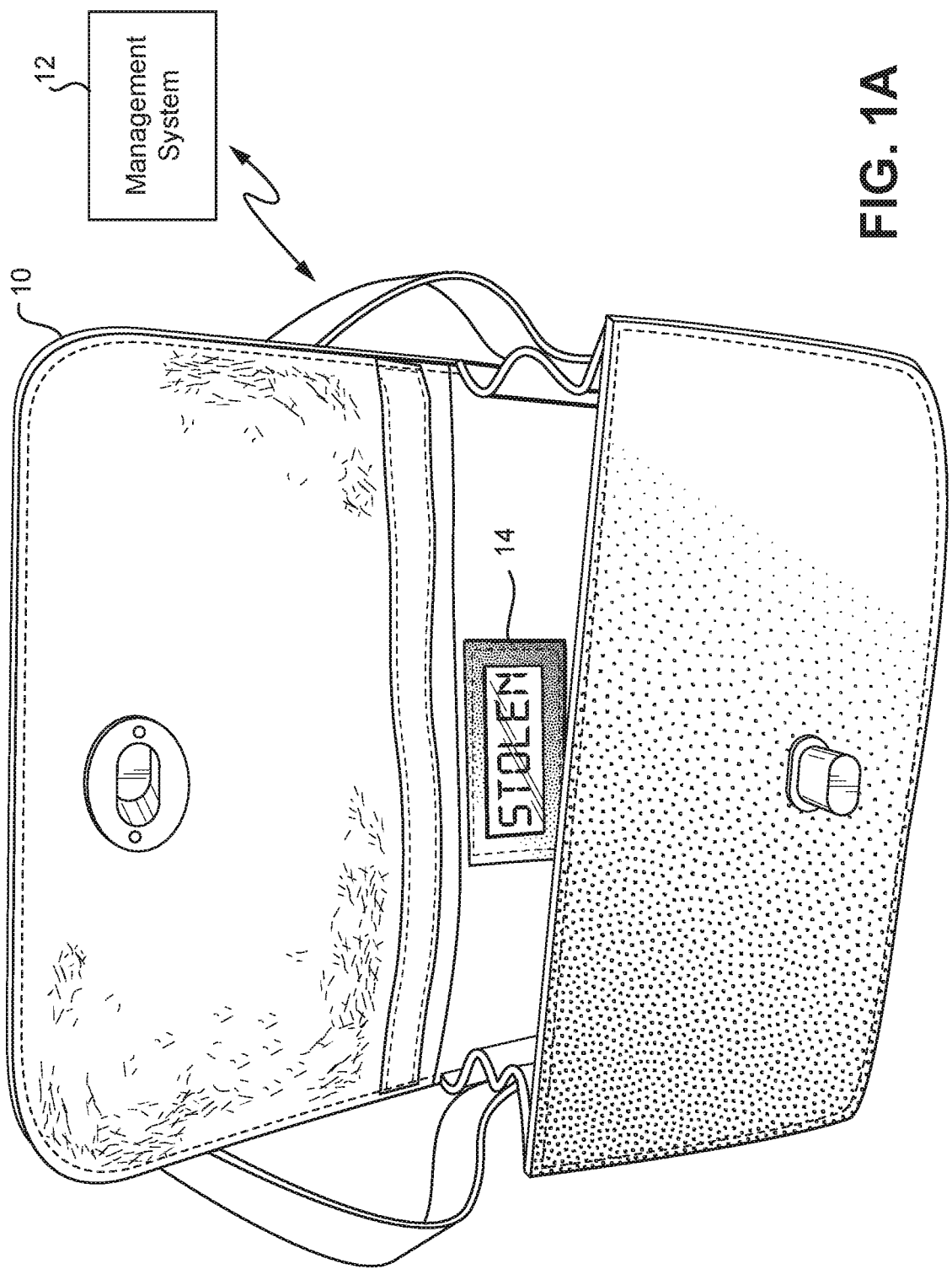
FIG. 1A shows an example item with an automatic indicator that indicates the item has been stolen.

Example embodiments of non-limiting technology herein provides systems and methods of reliably and repeatedly determining, in real time or otherwise, one or more physically uncopiable attribute ("PUA") instances (of the same or varying types) from an article of manufacture, using the selected PUA to produce an unforgeable identity for the article, and then integrating that unforgeable identity into computer-based tracking systems in a way that permits the tracking system to track and monitor articles for which PUA-based identity information is known.

Example non-limiting aspects of technology herein provides a protected article comprising an authenticity-enabled component integrated within or part of the protected article, the authenticity-enabled component comprising a functional aspect of the protected article and an authenticity-providing electrical or electronic circuit which provides authenticity indicia derived from at least one aspect or characteristic of the protected article.

Further example non-limiting aspects of technology herein provides a protected article comprising an object or component having at least one physical attribute that distinguishes said object from at least some other objects; the protected article being further comprising an electronic sensor affixed to the object, the automatic electronic sensor automatically sensing the physical attribute of the object; and a communication device coupled to the sensor, the communication device reporting information relating to or derived from the physical attribute.

The protected article may be further characterized in that the physical attribute is uncopiable and distinctive. The protected article physical attribute may be unique.

The protected article may include a cryptographic element is structured to receive the sensed physical attribute and to develop a cryptographic authentication value based therein. The protected article communication device comprises a wireless communication device. The protected article sensor may comprise at least one of an electrical resistance sensor and an optical reader integrated with the article, the reader detecting physical attributes of the object that are difficult to change or duplicate.

Additional non-limiting aspects of technology provide an article comprising a substrate, and further comprising an authentication circuit which provides authenticity indicia derived from an inherent property of the substrate. The substrate may comprise at least one of fabric, leather, a polymer, carbon fiber and metal. The authentication circuit may derive the indicia from a component that is integrated as part of the article so that its removal will damage the structure and/or appearance of the article. In this context, "non-removable" does not require that it is impossible to remove the component from the article, only that removal or attempted removable will damage the structure, function and/or appearance of the article. The inherent substrate property may consists of an automatically-readable electrical and/or physical attribute or characteristic of the substrate.

Further example non-limiting aspects of technology provide a protected article comprising an authenticity-enabled component attached to the protected article in such a way that detaching the authenticity-enabled component will damage the protected article, the protected article further comprising the authenticity-enabled component consisting of an authenticity-providing electrical circuit which provides authenticity indicia derived from at least a first aspect of the protected article, and the protected article having a further contactless authentication device embedded therein, and the authenticity-enabled component is configured to it does not interfere with authentication of the further contactless authentication device.

The protected article may comprise a customs document.

Example non-limiting aspects of technology herein provide a fashion accessory comprising an authenticator integrated within the fashion accessory in such a manner that its removal will reduce the value of the fashion accessory, the authenticator serving as a functional aspect of the fashion accessory, the authenticator including an authentication circuit which provides authenticity indicia derived from a physical aspect of the fashion accessory.

Further example technology herein provides a fashion article comprising a component that is integrated as part of the fashion article so that its removal will reduce the fashion value of the fashion article, and an authentication circuit which provides authenticity indicia derived from the component.

The authentication circuit may measure the electrical resistance of a portion of the component. The authentication circuit wirelessly reports the authenticity indicia. The authenticity indicia may be unique to the fashion article. The authenticity indicia may be substantially immutably bound to the fashion article. The component may form a structural aspect of the fashion article. The component may provide a decorative aspect of the fashion article. The component may provide a functional aspect of the fashion article that is unrelated to authentication. The authentication circuit may be a part of the component.

Further example non-limiting aspects of technology herein may provide a fashion article comprising: a component that is integrated as part of the fashion article so that its removal will damage the appearance of the fashion article, the fashion article being further comprising an authentication circuit which provides authenticity indicia derived from the component.

Further example non-limiting aspects of technology herein may provide a method of manufacturing a fashion article comprising integrating, as part of the fashion article, an authenticatable (i.e., able to be authenticated) component and a circuit that provides authentication indicia; reading the authentication indicia from the circuit; and storing the authentication indicia in a database.

The stored authentication indicia may be used to track the fashion article.

A further non-limiting example aspect of technology herein relates to an authentication component for use with a fashion article comprising a component structured to be integrated as part of the fashion article so that its subsequent removal will reduce the fashion value of the fashion article, the component including an authentication circuit that provides authenticity indicia derived from the component.

Physically uncopiable attributes ("PUAs") are attributes or characteristics of the article that are inherent to or in the article itself. For example, PUAs may typically be inherent in the materials used during the manufacture of the article and/or in methods of manufacturing the article. Pluralities of PUAs are typically or often present for each article; the challenge is how to identify and characterize them, and then utilize this information in a system that provides assurance of authenticity, presence, and provenance. Use of PUAs, and in particular, unique sets of PUAs may allow an attribute to be uniquely identified. Tracking and authentication systems that rely on article PUAs can use techniques that permit the repeatable extraction of a useful subset of PUAs and the real-time use of this extracted PUA information to determine integrity and authenticity of the article.

Example non-limiting technology herein can provide techniques for, in any combination:

A) Capturing the PUA using a sensor or sensors attached to the article;
B) Selecting/filtering the PUA for useful PUA to create digital artifacts useful for identifying and/or securing communication between a key device and a management server;
C) Creating tracking device specific challenge response pairs (indicia) based upon the selected/filtered PUA;
D) Creating PUA derived unique cryptographic keys, certificates, and digital identities; and/or
E) Securely providing these items (identities, cryptographic keys and certificates, challenge response pairs) to the management system for use in subsequent key device identification and securing communications;
F) Securely identifying and tracking a protected article using one or more of these identities, cryptographic keys, certificates, and challenge/response pairs.

In use, one non-limiting aspect of a management system selects one or more challenge/response pairs for an article and requests the attached tracking or key device to authenticate using the selected challenge/response pairs over a secured, encrypted channel A PUA-derived challenge response pair is an indicium, with the indicium tag being used as a challenge, and the indicium value is used as a response.

In one example non-limiting embodiment, the PAMS server challenges a tracking device comprising an integrated communicator, key, and indicator. PUA-derived cryptographic keys and digital identity(ies) may be used to create one or more unique secure channel(s) between management system(s) and the tracking device, over which challenge requests may be securely issued. The tracking device responds to the one or more challenges with indicium values corresponding to each challenge, and the management system validates the responses to each challenge against previously provided responses stored in the PAMS server. Valid responses calculated based upon freshly obtained PUA assure that the same, authentic article is still associated with the tracking device.

By using PUAs in this manner, the system provides a self-identified, self-authenticating article and an end-to-end secured tracking system.

Example embodiments herein demonstrate systems, processes, and techniques for the verification, identification, tracking, and recovery of articles of manufacture embodying techniques for identifying articles based upon PUA, the creation of PUA-derived digital identifiers, coupled with technologies for tracking and recovery of these articles if they are lost or stolen.

One particular challenge and potential application of the technology herein is the authentication and tracking of documents, artifacts, and fashion articles of manufacture. These articles are typically manufactured using materials and processes for which tracking and authentication materials are not readily added; either because the addition of authentication and tracking technologies detract from the aesthetics or value of the article, or because the articles are initially manufactured without tracking and authentication in mind. The technologies described herein use PUAs of these articles in order to authenticate them.

Example embodiments herein provide an authentication and tracking component for use with collectable artifacts that may be affixed to the article in order to authenticate and track the protected collectable artifact. Articles of this type were in the past typically authenticated manually due to the lack of solutions that could authenticate, provide verifiable provenance, and track the location and status of article in real time. Manual authentication of artifacts is, by its nature, subjective and often takes days or weeks to complete, and "good" forgeries often make it past the examiner. The authentication and tracking component affixed or integrated into the protected article as described herein measures PUAs of the article and uses the PUAs to quickly authenticate the article in an unforgeable manner. The component and system additionally provides provenance and tracking information for the article, which supports the value of the protected article.

Additional example embodiments herein provide an authentication and tracking component for use with official and high value documents. Examples of these types of documents include documents related to complex financial transactions, including letters of credit, guarantees, banker and buyer acceptance certificates, and inspection certificates, access credentials, passports, visas, drivers licenses and other similar articles. Each of these types of documents or articles is subject to forgery, misdirection, and loss, and they require mechanisms for mitigating these risks.

In an example embodiment, complex commodity trade documents are typically internationally delivered by a courier in a sealed courier bag. A courier bag constructed using the technologies described herein may regularly provide its location and status by having a key monitor in real time the integrity of the bag materials and latch status by measuring and monitoring at least one PUA of the bag and latch. Opening the bag results in notification of where and when the courier bag was opened (or when and where it was tampered with), and permits later determination by the receiving party that the bag and its content are authentic and have not been tampered with. In other example embodiments, an integrated device as described herein may be affixed to part of an official document, where the device measures and monitors a least one PUA of the official document.

Example technology herein further relates to authenticating and tracking physical articles using digital techniques, with purposes as varied as inventory, supply chain integrity, asset recovery, and forgery identification. Some such prior systems suffer from challenges as they interface between the digital and physical world. Some such past schemes that attach identification and tracking devices, in the form of labels, radio frequency id (RFID), and network-connected tracker devices are understood, along with their weaknesses vs. various attacks that make their results less useful.

For example, if a tracking device is attached to an article, questions may remain as to whether the article and the device are still together, whether a substitute or forged article is present, whether the tracking device is being "spoofed", etc. As discussed above, past identification of forgeries was often a manual task and known systems remained subject to attacks that devalued the information they provided. Desirably, tracking and verification systems for most types of articles should in some non-limiting applications be easy to recognize, which made trackers and tags easy targets for attacks to compromise and/or remove from the article they protect.

Electronic systems can sometimes be prone to hacking attacks that compromise some combination of the tracking device, communications, and/or the server infrastructure. All classes of secure chip-based systems may to some degree be vulnerable to one or more of these attacks any of which, if successful, could compromise the system and make it unusable. Technology herein reduces those risks or the consequences thereof.

Still other example embodiments herein provide an authentication component for use with a fashion or other article comprising a component structured to be integrated as part of the article so that an indication the component provides and/or removal of the component from the protected article will reduce the fashion or other value, usefulness or use of the article. In this context, the component includes an authentication circuit that provides authenticity indicia derived from the component. Here, "reduce the fashion value of the fashion article" means to sufficiently alter the structure and/or appearance of the fashion article after manufacture of the fashion article to make it obvious that the fashion article has been altered from its original form. Similarly, "reduce the value of the protected article" means to sufficiently alter the structure and/or appearance of the article to make it obvious that the article has been altered from its original form and/or to make the protected article, through change of appearance and/or function, unsuitable for use for its intended purpose. The value of financial or official documents may have their value reduced if their provenance and/or authenticity comes into question, thus a protected article comprising a bag or pouch designed to protect these documents from access in transit has a value only as long as the documents it contains are determined to not be tampered with. Such alteration could take many forms such as destruction or damage to the structure of the protected article, changes in coloration or other visible appearance of the protected article, a textual or graphic indication that the protected article has been "lost" or "stolen", or other arrangements. Generally speaking, the protected article can comprise anything of value including for example, an original work of art, an artifact, an article of manufacture, an official passport or other official government or corporate document, a financial instrument, or any other item it is desirable to track, protect and/or authenticate.

FIG. 1A shows an example high value item 10 (in this case, a fashion article such as a purse or, alternatively a commercial courier bag) that embodies the protection system included herein. In this particular example, a protected item 10 may comprise a purse, dress, shoe or other high value item. For example, the purse shown could be a designer purse made out of high quality leather or other material with a distinctive aesthetic design and coloration that enables it to be sold for thousands of dollars. In the example shown, a key that measures and reports unique values based upon one or more protected article PUA is incorporated within high value item 10. In this context, the term "key" is shorthand for "key device" and does not per se mean a cryptographic key or information used to identify item 10. In cases where the integrity of the item 10 needs to be monitored, additional keys that monitor the integrity of one or more aspects of the item 10 may be utilized.

The monitored portions of item 10 may be exposed to view or may be integrated within the structure of the item 10 during its manufacture. The high value item 10 is in communication with, or may also include, a communicator that communicates between a key and an external management system. Such communication can be encrypted or otherwise secured using PUA-derived unique device IDs and cryptographic keys in order to form an end-to-end secure communication channel between the management system and the key(s) of the protected article. This secured channel connects known and validated endpoints, e.g. the management server, and a key that is identified and authenticated using PUA-derived cryptographic information. The management system 12 provides components that interface with the key (preferred wirelessly but wired is also possible), and also may access a database providing data structures for storing protected article information including protected indicia, key information, communicator information, status, and location information, as an example. In the example shown, the protected article indicia may be calculated from one or more measureable aspects of protected article 10, and may be produced by the key as a result of the measurement of one or more physical properties (e.g. PUAs) of the protected article by a key. One indicium or a set of indicia can be generated from a set of PUA. These indicia values thus describe a uniquely identifiable aspect of protected article 10 that may for example distinguish the particular protected article 10 from some or all other protected articles.

In the particular non-limiting example shown in FIG. 1A, protected article 10 includes an indicator 14. Indicator 14 is an element of protected article 10 that displays the status of the protected article. In the example shown, secure or other interaction between the imbedded communicator of protected article 10 and management system 12 provides a status of "stolen" which is displayed by indicator 14. This "stolen" status essentially destroys the fashion value of article 10 because as soon as the protected article 10 is opened, any bystander would be able to immediately see that the article is stolen.

Figure 1B:
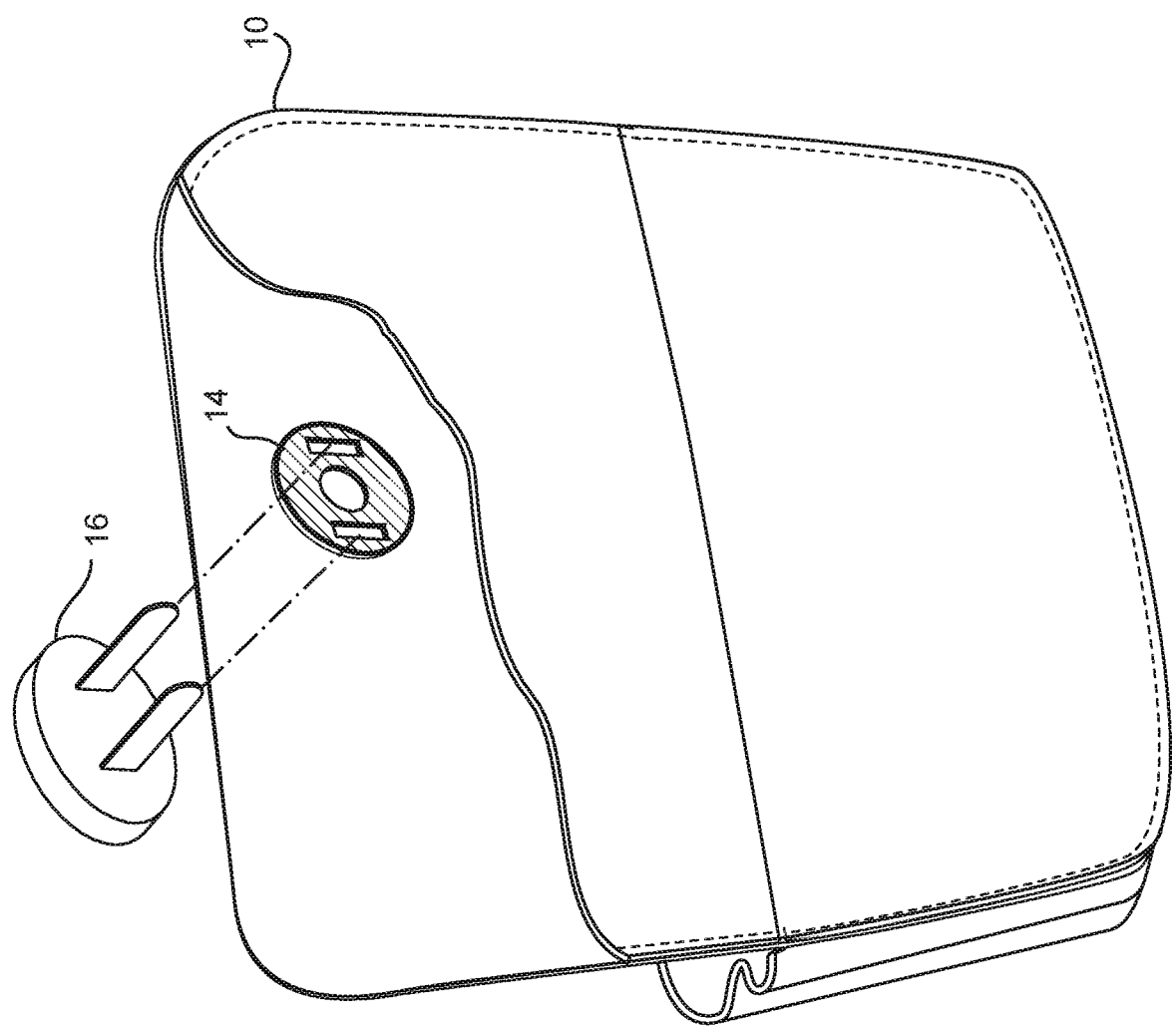
FIG. 1B shows an example item where a conventional closure clasp backing plate is used to provide an authentication key.

FIG. 1B shows an example key 14 which may be incorporated into the structure of the protected article 10. In this example, key 14 may comprise a conventional backing plate which is used to provide structural support for a magnetic or other clasp closure device 16 that is part of protected article 10. In the example shown, this backing plate 14 includes an electrical or electronic circuit capable of providing a unique or distinctive identifier derived from the backing plate's PUA that identifies protected article 10 and distinguishes protected article 10 from some, most or all other protected articles. A key integrated into a closure backing plate in this manner can also monitor the status of the closure and report upon the status of the closure if desired. Key 14 is bound to the protected article, and removal of the key 14 will be highly conspicuous and potentially destroy or at least reduce the fashion value of the protected article.

Figure 1D:
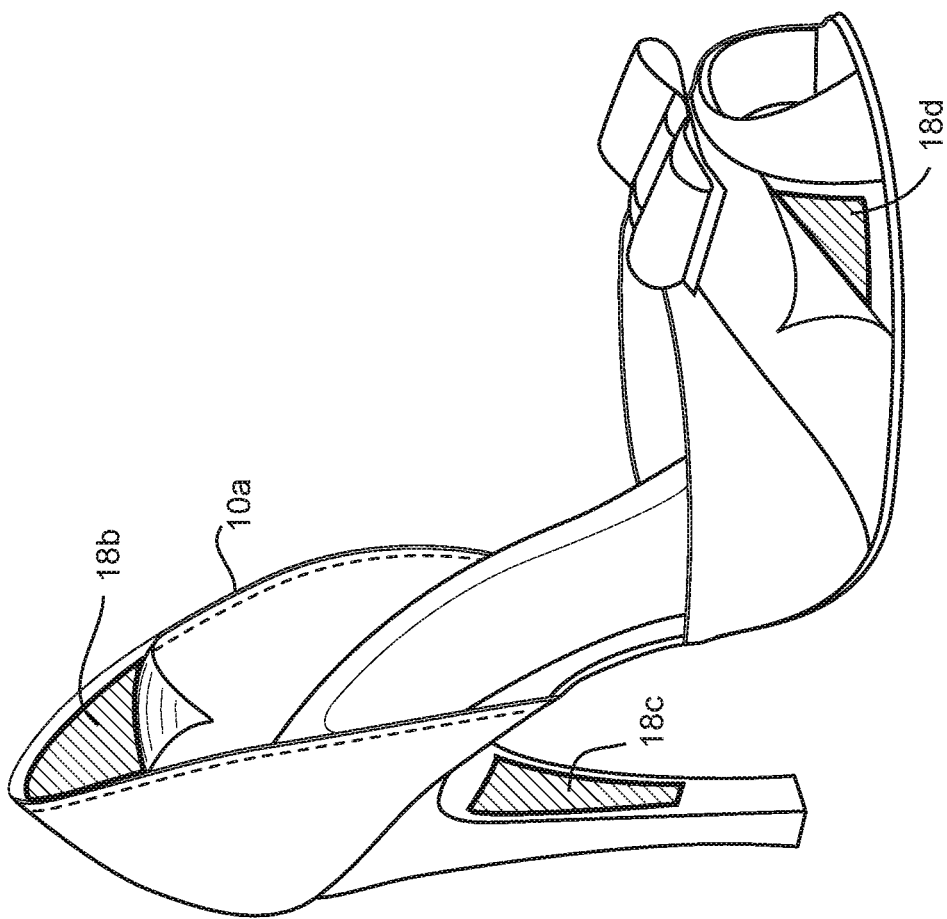
FIGS. 1C and 1D show example items with keys integrated as part of their structures.
Figure 1C:
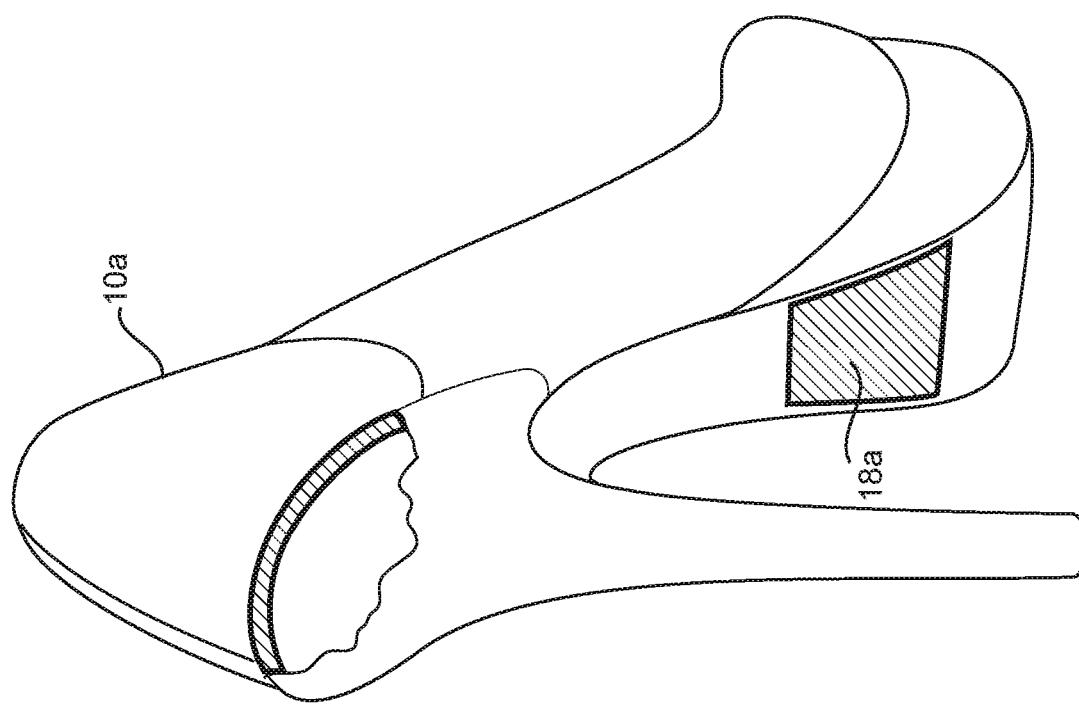

FIGS. 1C and 1D show an additional protected article 10a, in this case a women's shoe. In the example shown, the shoe 10a includes structures 18a, 18b, 18c, 18d which can be used by keys 14 to produce protected article indicia. These structures 18 are integrated within the shoe 10a so that removal of the structure will reduce the fashion value of the shoe. Such key structures 18 may be electronically queried to detect protected article properties (e.g. PUA's) comprising at least one measurable aspect of the protected article. Multiple keys may be incorporated within a given protected article, each producing one or more (unique) indicium. Thus, the protected article indicium values reported by the multiple keys of the protected article, taken together, describe uniquely identifiable aspect(s) of the protected article.

Figure 1E:
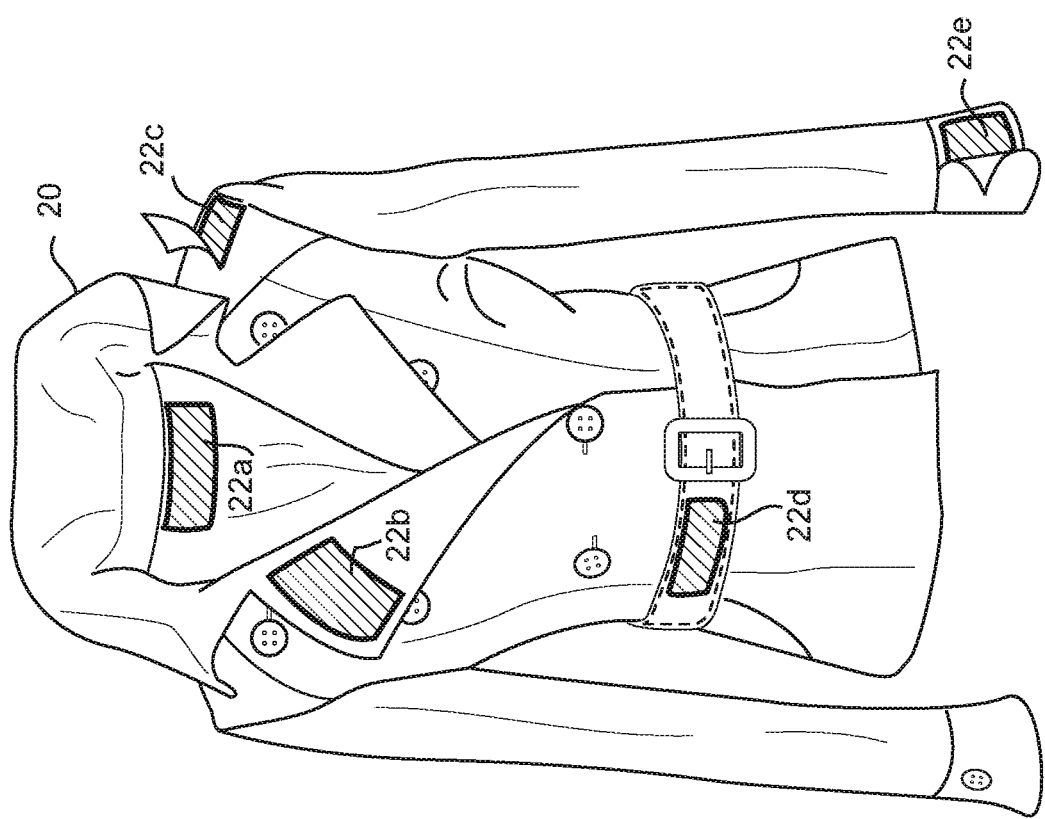
FIG. 1E shows an additional kind of item with example structural elements used to provide authentication keys.

FIG. 1E shows an example additional protected article 20, in this case a fashion jacket, which includes various structures 22 that may be used for indicia. Alternatively, inherent properties of the article 20, such as minute defects in the surface of the leather or other compositional material can be used as PUAs.

Figure 1F:
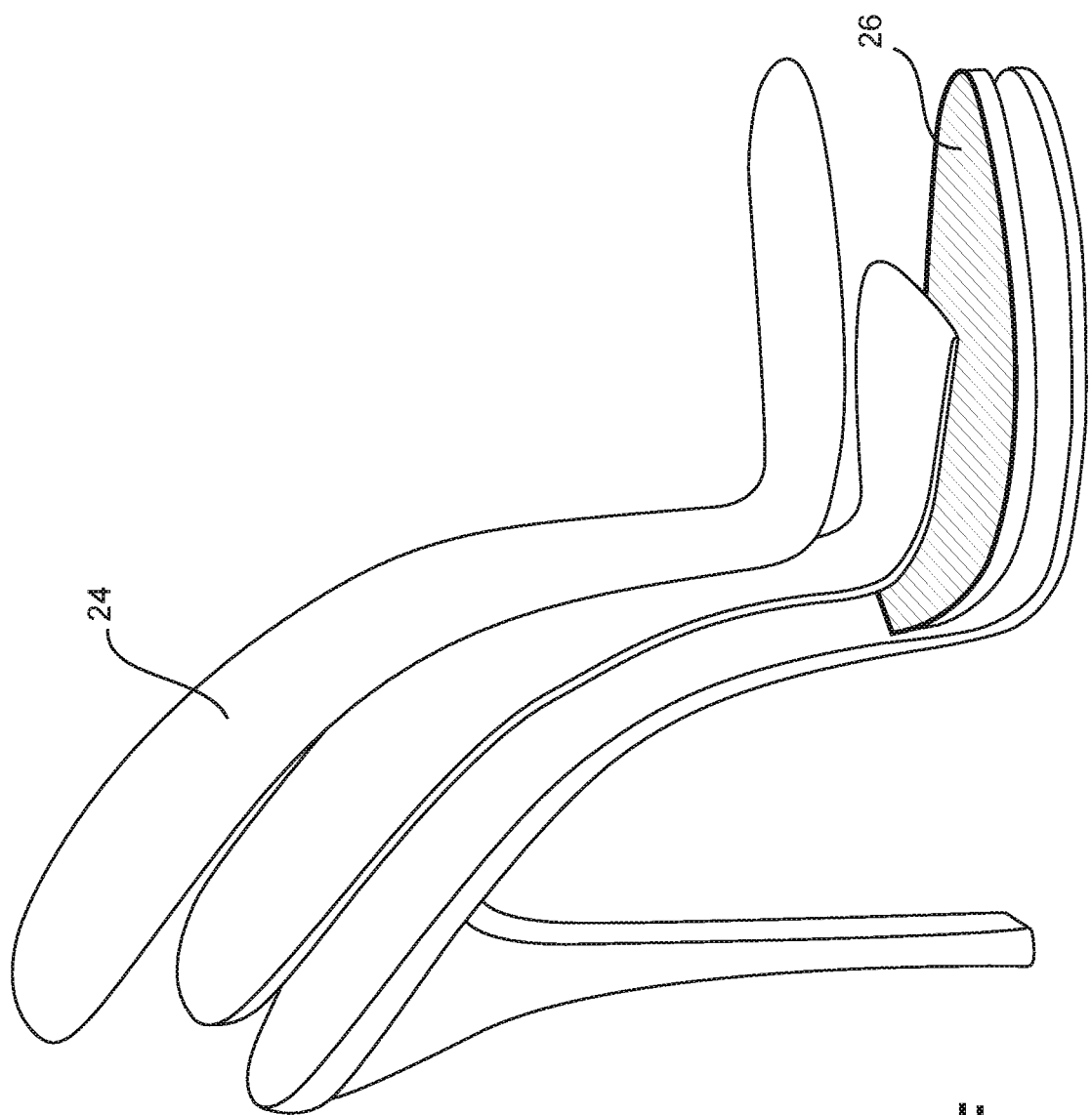
FIG. 1F shows an additional item with an additional inter-sole structure used to provide an authentication key.

FIG. 1F shows an additional protected article 24 in exploded view showing an inter-sole structure 26 that may be used as the protected article key. As in the examples above, any attempts to remove the structure of key 26 will destroy or reduce the fashion value of the protected article 24. Thus, the key 26 is physically bound to the protected article in a manner such that substitution attempts become impossible or impractical.

Figure 1G:
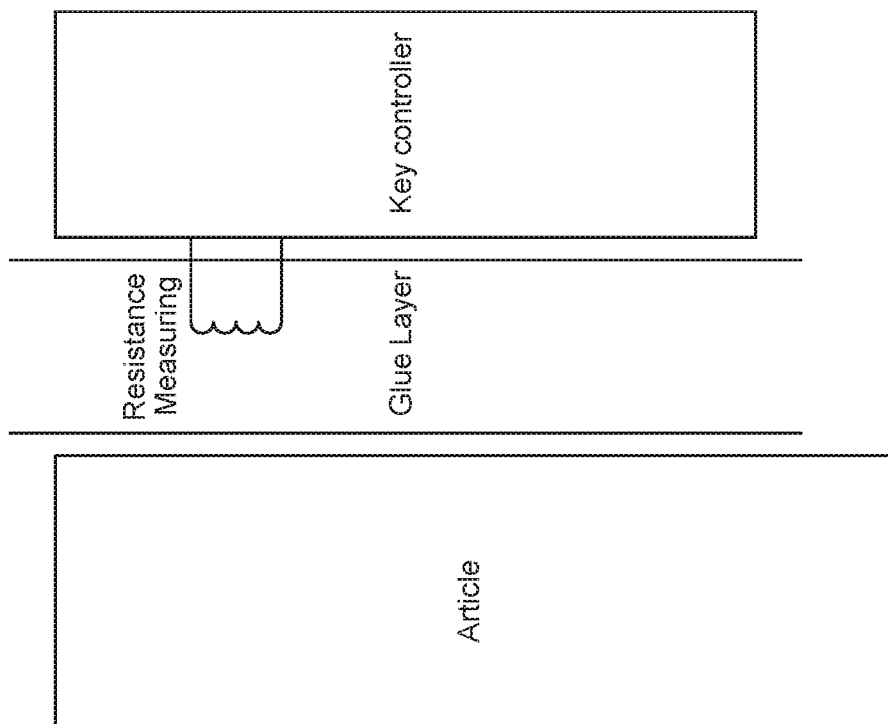
FIG. 1G shows an additional protected article with a key attached to an integral portion of the protected article.

FIG. 1G shows an additional protected article 24, in this case, a key attached by adhesive to an integral portion of the protected article. The bonding interface between the key and the article is monitored by e.g. an electrical properties measuring sensor to detect tampering and/or removal/separation of the key from the protected article by detecting the change in electrical properties of the adhesive interface.

Example Non-Limiting Architecture

A Protected Article Management System (PAMS) provides a system for the authentication and real-time status reporting of protected articles. PAMS architecturally comprises four major components, each comprising one or more subcomponents as illustrated in FIGS. 2, 2A and 2B and described below.

Figure 2:
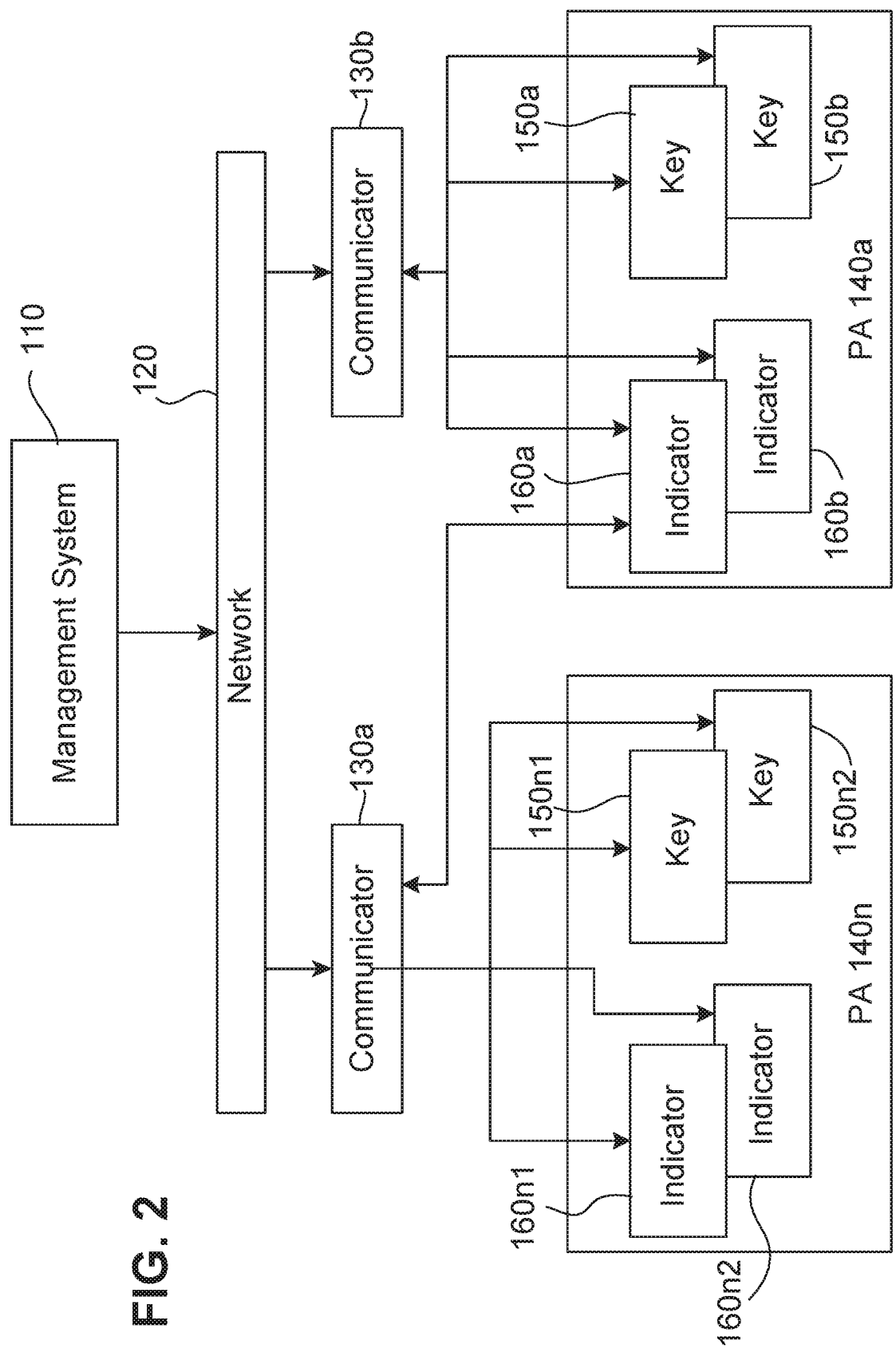
FIG. 2 shows a block diagram of an example non-limiting management system able to communicate with a plurality of protection devices.
Figure 2A:
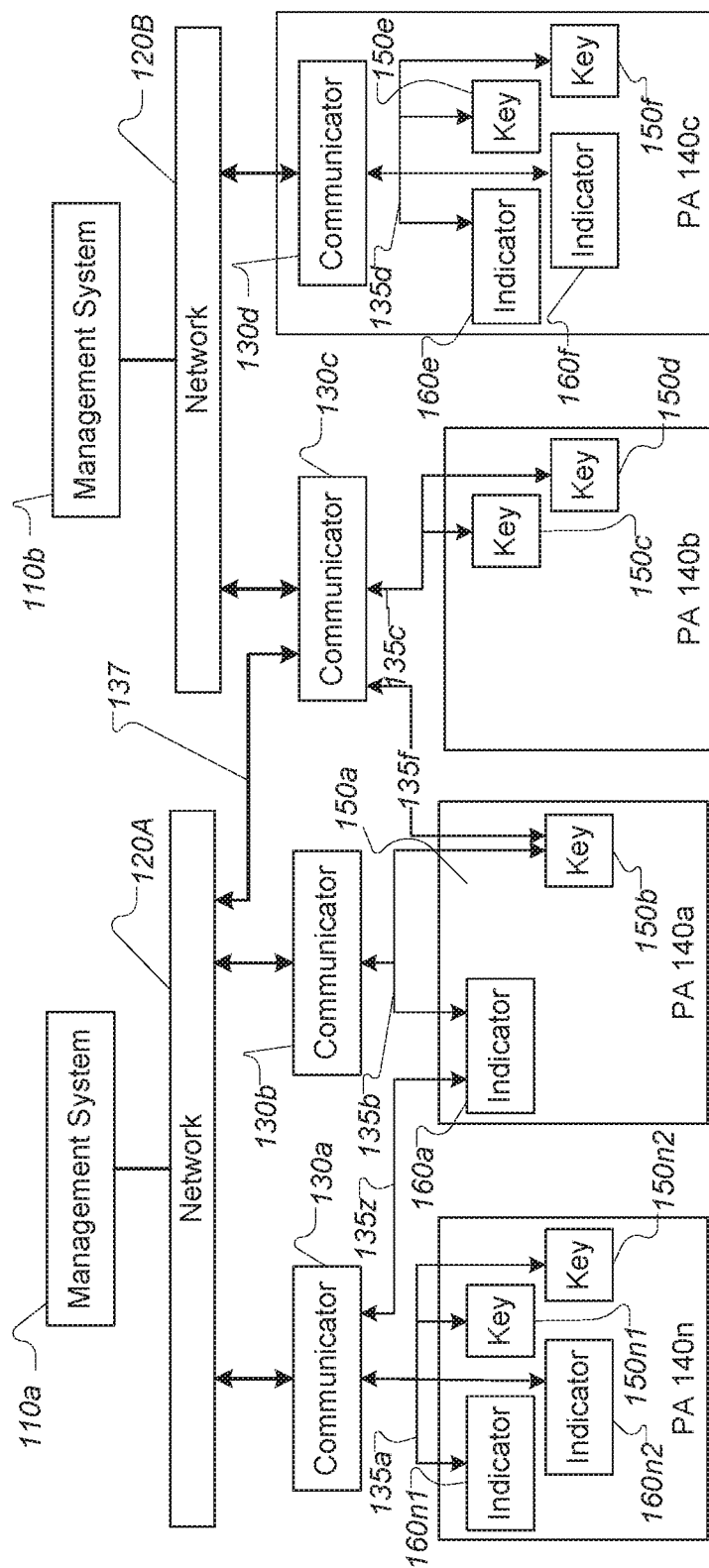
FIG. 2A illustrates an additional non-limiting exemplary deployment architecture of the Protected Article Management System.
Figure 2B:
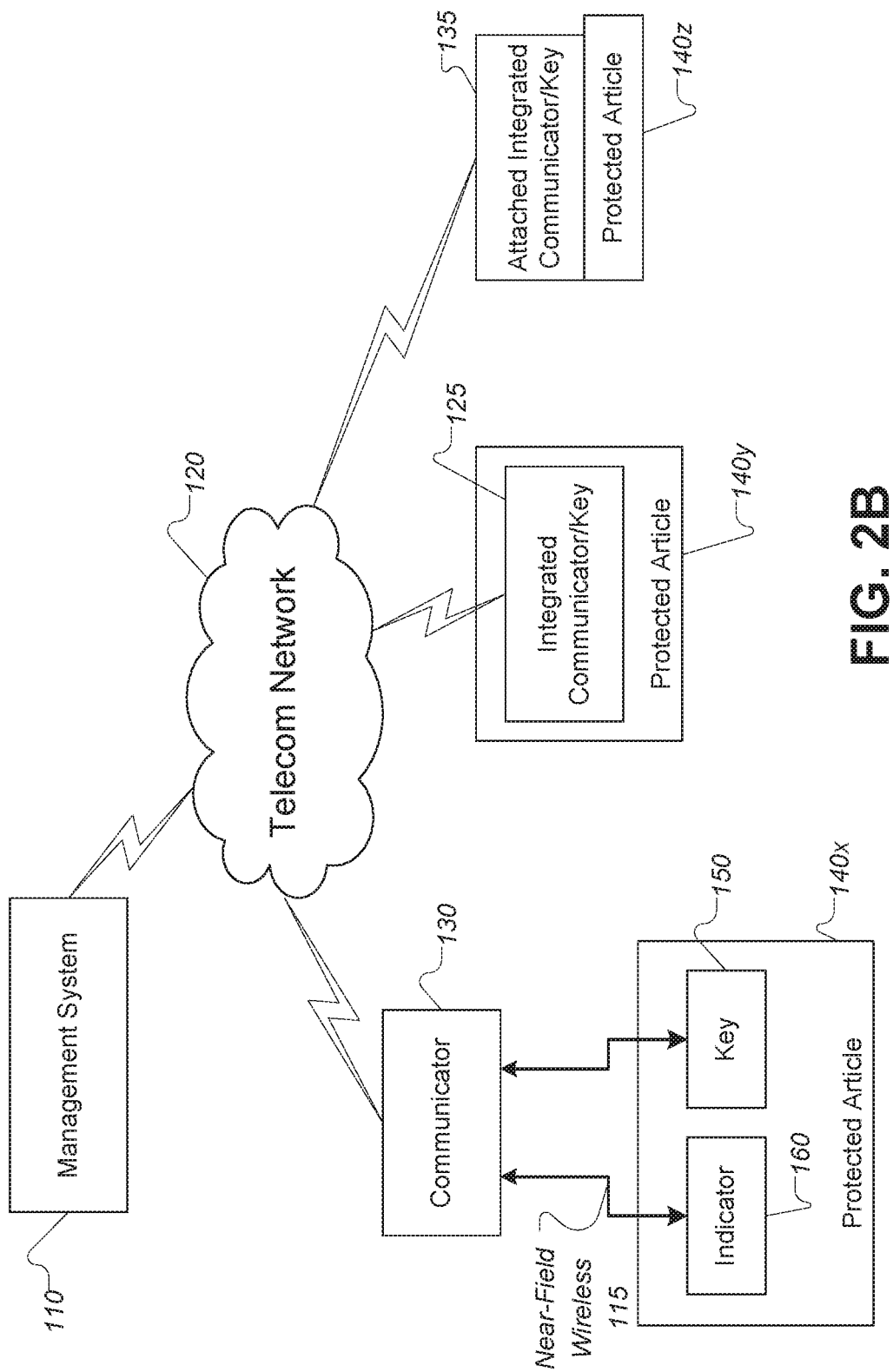
FIG. 2B illustrates exemplary relationships between the key, indicator, communicator (and integrated versions of these components) and other components of the Protected Article Management System.

FIGS. 2 and 2A illustrate relationships between various components of the PAMS:
  Protected articles (e.g. 140a, 140b, 140c, 140n), further comprising the article itself, persistently associated with one or more keys (e.g. 150b, 150c, 150d, 150e, 150f, 150n1, 150n2) and zero or more indicators (e.g. 160a, 160b, 160e, 160f, 160n1, 160n2).
  One or more secure communicators (e.g. 130a, 130b, 130c, 130d), in communication with one or more protected article keys, zero or more indicators, and at least one management system (e.g. 110a, 110b).
  A network (e.g. 120, 120a, 120b), for communication between the communicators and the management system.
  Wireless networking (115), such as Bluetooth or WiFi (e.g. 802.11-based networking), for communication between the keys, indicator(s), and at least one communicator. In some implementations, the keys and indicators may be connected to the communicator using wires in lieu of wireless networking.
  At least one management system (e.g. 110, 110a, 110b), for storing and managing protected article information, performing authenticity checks of protected articles on the basis of indicia provided by one or more keys associated with a protected article, and for determining the current status of protected articles.

As illustrated in FIG. 2A, the system provides a non-traditional communications pathway between PAMS servers, keys, and indicators. These communication pathways have several attributes. Information travels between keys and indicators and management server(s) using traditional endpoint authentication and session protection mechanisms (e.g. ssl/tls-based encr-based encryption). Endpoint authentication (by the key devices) is provided using information derived from unique characteristics of the protected article, such as PUA-derived device ID, PUA-derived device certificates, PUA-derived cryptographic key pairs, and PUA-derived challenge/response information (e.g. indicia). Any of these PUA-derived materials may be used to authenticate a key endpoint. PUA-derived indicia are a preferred method because they provide further assurance that the key device and the protected article are still together.

Some keys may have limited wide area communications capabilities and rely on fixed access points (e.g. WiFi) or mobile peering (e.g. BLE peering) with communicators that provide the wide area communications needed. The fixed access points and peered communicators serve to pass network traffic between keys and PAMS servers. They may also provide store and forward and related communications services.

While all-on-one (a single device key/indicator/communicator) device implementations are envisioned, the architecture supports more diverse hardware deployments in which keys and communicators are separated in order to provide defenses against unauthorized RF-based tracking of protected articles by monitoring higher power or other RF or other signals emanating from their key devices. Some of these deployments are described below.

First, communicators may interact with one or more sets of keys and indicators as shown by the interaction (e.g. 135a) between communicator 130a and protected article 140n (and its associated keys and indicators (e.g. 160n1, 160n2, 150n1, 150n2). Each communicator may interact with any number of indicators and keys associated with numerous protected articles. This decouples the key and indicator devices from the long haul communications devices, permitting the key and indicator devices to operate with substantially smaller power needs and with a substantially lower RF signature. It also provides redundant and alternative communications pathways for devices in case of long haul link failure. The reduced power requirements of low power key and indicator devices means that in some implementations, the key and indicators may be powered using RF harvesting techniques known in the art.

An additional non-limiting feature of the system architecture is that a single indicator and/or key may interact with more than one communicator in order to communicate with a PAMS server, as illustrated by interactions 135b and 135z, in which indicator 160a interacts with two disparate communicators. Being able to communicate with a plurality of communicators affords advantages when a communicator is lost or a protected article is lost or stolen. Specifically, the indicators and keys associated with a protected article may re-establish communications with a management system (110) if a previously used communicator is lost, stolen, or ceases to function. The secure end-to-end validation between the keys, indicators and a management server typically does not rely upon a specific communicator to function. Communicators thus act in a pass-through role that functions to provide longer distance communications (which require additional battery life), such as a GSM or CDMA link to a telephony network, and may provide location information using GPS, cell tower or WiFi triangulation techniques. Alternatively (not shown), keys and indicators may interface with public or private WiFi networks or with Bluetooth peer-to-peer networks in order to use these systems as communicators. In some implementations, the keys and indicators may pass information about their observed RF environment to the PAMS server for the PAMS server to use in computing the key and indicators location.

Additionally, the keys and indicators may re-establish communications with a PAMS management system using whatever communicators are available if the protected article has been mislaid or stolen. This permits redundancy in the communications path and lets the communications be self-healing if a communicator is lost or damaged. In addition, a specific key, indicator, or communicator can be associated with one or more management servers. This permits different systems to monitor a protected article, for example, a manufacturer-based first management server, and a second, insurance provider management server. The key device architecture supports generating different initial values, cryptographic materials, and indicia for each management server that the key is in communication with. This limits the amount of information about the underlying PUA and indicia generation algorithms available from monitoring the communications between the key and the PAMS server, and further limits infrastructure damage if a PAMS server is compromised and stored key device information is exposed. A key device may simply be reinitialized for communications with the repaired PAMS server in order to create new initial values. A key device may simply be reinitialized for communications with the repaired PAMS server in order to create new initial values, cryptographic materials, and indicia for the key device.

When a protected article is reported as lost, but the keys of the article are still in secure communication with the PAMS server, the PAMS server may provide to an authorized searcher the current and/or last known location of the protected article. As the searcher comes within short term radio range of the protected article, the PAMS server may instruct the key(s) to communicate with the searcher's communicator so that direction and distance between the communicator and the key may be electronically determined and displayed for the searcher.

FIG. 2B illustrates a exemplary system arrangement of protected articles (e.g. 140$x$, 140$y$, and 140$z$) associated with three different communicator/indicator/key arrangements (e.g. 130$x$, 160$x$, 150$x$), an integrated device (e.g. 125, 140$y$), and an attached integrated communicator/indicator/key (e.g. 135, 140$z$). Other arrangements of the system components are anticipated in alternative implementations.

In general terms, information about a protected article is added to the PAMS management server when the article is created and the key(s) initialized, at which time, the persistent association between the protected article, its key(s) and one or more protected article indicium are created and recorded within the management system. The key device/protected article association is persistent because keys measure intrinsic, physical, or structural attributes of the protected article (e.g. PUA) and are integrated within the item or attached to the item itself in such a way that removal of the key disables the key and/or changes the indicia reported by a key. Since the keys measure and report upon intrinsic characteristics (e.g. PUA) of the protected item, a remote system is able to determine that 1) the key is not spoofing the protected article information, and 2) that the key has not been removed from the protected article with which it is associated.

If the key device(s) are reinitialized, previous indicia are immediately invalidated as they are created by a one-way algorithm that is randomly parameterized when the key device is initialized for communication with a particular PAMS management server. This makes each set of indicia generated by a key device unique to the current instance of key device/server initialization, without changing the underlying PUA.

The PAMS also maintains associations between the protected article and indicators. In particular, if indicia, as measured and/or calculated, and then reported by the key, do not match with the information on file for the protected article, the PAMS directs one or more communicator(s) to set the status of at least one indicator associated with the protected article to indicate validation failure.

In some implementations, it is preferable to combine the functions of one or more key(s), zero or more indicator(s), and a communicator together in a single device. The precise configuration of key(s), indicator(s), and communicator are dependent upon the type of protected article and may vary.

Throughout its life, the protected article may be actively and repeatedly managed by PAMS. A protected article is verified by the repeated re-measurement and comparing of new key-provided indicia against the pre-recorded indicia stored in the PAMS database. The PAMS system, on behalf of users who have a need to know the current status of a protected article, may, on a periodic and/or ad-hoc basis, communicate with communicators associated with a key device and cause the communicator(s) associated with the protected article to communicate with the key device(s) of a protected article in order to obtain new indicia readings in order to provide a trusted, verifiable current status and location of the protected article.

Example Non-Limiting Management System

The management system comprises computer servers and systems of customary design (including processors, memories, and operating software components) along with sufficient network interfaces and protocol support to enable the management system to communicate over a network with one or more communicators and/or key devices. Additionally, software and/or hardware on the management system servers includes program logic to provide user interfaces to directly connected users and to users connected over a network, schedule communications, determine the validity of protected articles, and perform the functions described below in the process examples. External authenticity providers, such as article graders/certifiers, certifying authorities, etc., can be employed as part of ensuring that the protected articles can be authenticated.

Examples of management systems servers include a server running Windows and IIS (e.g. Windows 2008 Server) or a server running Linux and the Apache web server. Interfaces can include for example web screens running on a smartphone, displayed in the smartphone web browser, and served by the management system. More generally, examples of the user interface can include web screens running on network connected web browsers running on personal computers or a web screen running on a cellular data network connected web browser running on a smart phone screen. The servers of the management system may be provided individually, in parallel, or in a distributed fashion as necessary to handle the request and calculation loads required.

The management system further comprises computer program code effective to communicate with users, one or more communicators, and a storage system to store protected article information, and to manage the protected articles by registering new protected articles, requesting and verifying indicia provided by keys of protected items, and to set indicators as specified in the program logic. As described above, requests against the keys are generated by the management system program upon user request and/or on a timed (periodic or other) basis.

The Management System interfaces to one or more databases (and associated database software, if required). Typically, the database is resident on the management system servers, along with software that provides user and network access to the databases. No particular database system is required. Commercial SQL-based databases from Oracle, Microsoft, Informix can be used, as can, for example, structured XML-based file system representations. The selection of the particular database system to use can be made by one skilled in the art without loss of desired function.

The database(s) store (on one or more persistent non-transitory memories of a management system server) information about the protected article(s), communicator(s), indicator(s), keys, indicia, and associations between these items. Example data elements of the information stored in the management system databases are provided below. The data element lists are not presented in a formal schema or database layout. The conversion from the element list to a schema used by the selected database application used on a particular PAMS server instance may be performed by those skilled in the art.

The protected article is the high value item that is being tracked and protected by PAMS.

| Example Protected Article Information | |
|---|---|
| Article ID | A unique or other ID assigned to a protected article. This is an internal value used on the PAMS, it is not available to article owners and is not publicly displayed. It is not intended to act as a "serial number" |
| Status | Status and date of status |
| Logs | Logs of historical use, location, and changes to the protected article |
| Provenance information | Protected article creator provenance information associated with the protected article. |
| Owner information | Current owner details, including name and contact information. |
| Associated communicator IDs | List of communicators associated with this article ID |
| Associated indicators | List of indicators associated with the protected article. |
| Associated key ID | List of keys associated with the protected article. |
| Key/indicia sets | List of key/indicia to be used associated with the protected article. |
| Communicator information | |
| Communicator ID | Unique or other ID of communicator |
| Status | Status of communicator |
| Last communication timestamp | Timestamp of last communication |
| Reported indicator ID list | List of indicator ID's/pairing information associated with this communicator |
| Reported key ID list | List of key ID's/pairing information associated with this communicator |
| Authentication info | Authentication info permitting the communicator to authenticate to other PAMS elements (servers, indicators, keys) |
| Indicator information | |
| Indicator ID | Unique or other ID of indicator |
| Indicator type | Type of indicator |
| Indicator pairing | Pairing information for this indicator |
| Key information | |
| Key ID | Unique ID of key |
| Key type | Type of key |
| Key status | Status of key |
| Last key timestamp | Timestamp of last key communication |
| Last key match timestamp | Timestamp of last key indicia match |
| Indicia reference values | List of last indicia tag/indicia value pairs tested |
| Key pairing | Pairing information for key |
| Indicia information | |
| Indicium Key | Key ID providing each indicium |
| Indicium Tag | Tags of each indicium (unique or distinctive to key) |
| Indicium type | Type of each indicium |
| Indicium value | Stored value of each indicium |
| Indicium timestamp | Timestamp of indicia generation |

Example Non-Limiting Secure Communicator

A secure communicator interfaces to, and communicates securely between, key, indicators, and the management system. A secure communicator may interrogate key device(s) for indicia and collects the response(s) from keys and indicators in order to forward them to the management system, and receives and forwards commands from the management system to keys and indicators. Secure communicators also serve as devices that may be used to identify and locate keys and indicators associated with lost or missing protected articles.

In some implementations, a secure communicator interfaces with keys and indicators using a wireless communications means, such as optical, WiFi, Bluetooth, or a near-field communications technique. In other implementations, a secure communicator is electrically connected to one or more keys and indicators and directly communicates with the keys/indicators using that connection. In some implementations, a secure communicator provides additional services, such as WiFi, cellular tower, and/or GPS or other location reporting. In one non-limiting embodiment, the protected article includes a further embedded contactless electronic authentication device such as an RFID or NFC chip, and the secure communicator is designed to use frequencies, power levels, and other characteristics so as not to interfere with the further embedded contactless electronic authentication device.

A plurality of communicators may interface with one or more protected articles and their keys. In some implementations, a communicator is integrated within the protected article. In other implementations, a communicator may be shared between a plurality of protected articles, and may be freestanding, handheld, or may be integrated with support infrastructure such as wired or wireless charging systems. In one non-limiting embodiment, each communicator is made up of a processor, a key, a battery and power harvester, and at least a BLE (Bluetooth Low Energy) transceiver. Additional 802.11 (WiFi) or telephony (e.g. GSM, CDMA) transceivers may be added to the embodiment as needs dictate or applications prefer. That combination is acted upon by an external wireless signal, causing the communicator's processor to interrogate the key in order to receive transmitted indicia values from the key over a BLE connection, and then to forward the received indicia to a management server utilizing an available communications link.

A plurality of communicators may be associated with disparate sets of protected articles, keys, and indicators. Multiple communicators provide redundant communications paths (e.g., using adaptive mesh network technology) between PAMS management servers (and databases) and the key and indicator devices of a protected article. Some or all of the communications paths may be used in such a way as to encrypt and/or secure reported information and data. For example, in one non-limiting embodiment, a communicator preferably communicates with the PAMS management servers using an encrypted communications protocol such as SSL or SSH. The communications between PAMS management servers and a communicator may be protected for integrity, privacy, and/or authenticity using these and other cryptographic techniques.

Example Non-Limiting Protected Articles

A protected article can in one non-limiting application comprise a commercial item that has high intrinsic value and a high resale value, but is generally hard to individually identify and authenticate. These classes of commercial items are often the subject of forgeries, theft and resale within the supply chain. Examples of such protected articles include designer clothing (e.g. purses, shoes, watches and dresses), high value household goods (e.g. rugs, furniture, antiques, artwork, artifacts, collectables), historical, official, and/or tracked document copies, and cases/covers for high value goods. A given PAMS system could be used to track certain types of articles, or a variety of different types of articles, or some subset of different article types. For example, one PAMS system might be used to track artworks while another PAMS system might be used to track official documents or the same PAMS system could be used to track both official documents and artworks. The PAMS systems can be expandable, with an initial implementation being directed at one type of article, and then the same system later expanded to track additional article types.

A protected article becomes protected by PAMS by registering the protected article and its keys within PAMS, persistently associating one or more key device(s)/indicia with the protected article, and periodically checking the protected article to ensure that the key device(s) are reporting the correct indicia for that article. At any time, PAMS may request a communicator to communicate with the at least one key associated with a protected article in order to obtain the now current indicia. Alternatively, the key or communicator may periodically and/or autonomously initiate this communication and send indicia to the PAMS management server for validation. In both cases, since indicia are derived by the key(s), at least in part, from PUA measurements by a key, the presence of indicia that match previously stored indicia indicates that the same protected article is associated with the reporting key(s); effectively assuring that the protected article is still present with the key. Similarly, if the PUA measured is associated with an aspect the integrity of the item (e.g. that the item has not been cut, ripped, or disassembled), receiving the correct indicia from a key assures that the protected article has not been tampered with in a way that disturbs the PUA being measured.

Example Non-Limiting Indicators

An indicator is a part of a protected article that displays the status of that protected article within PAMS. Not all protected articles need to have indicators, but it may be desirable for some articles to have such indicators. A protected article status may be indicated by a light or color, such as from an LED or electro-luminescent panel. Alternatively, the protected article status may be indicated on a display. For example, an indicator may be a panel of fabric that changes color in response to a status being set in the management system.

Removing an indicator devalues and/or defaces the protected article. Indicators may be permanently associated with the protected article by integrating the indicator function with everyday parts of the protected item. For example, an indicator may be a logo patch on a purse that turns orange (or some other noticeable or inappropriate color) if a purse is reported stolen, and is colored silver (as intended by the designer) if the purse has a non-stolen status in PAMS. Alternatively, the indicator may be embedded within a functional or decorative aspect of the protected article, such as a clasp or strap fitting of a purse. Again, if the indicator is removed, it significantly devalues the protected article by damaging it. Alternatively, an indicator may be affixed to a protected article using means that deface the protected article by removing part of the protected article along with the indicator, or by leaving behind an indelible mark or residue on the protected article.

Indicators communicate with PAMS using one or more communicators. The communicators may be electronically connected to an indicator, or they may be wirelessly connected using a wireless communications means, such as WiFi, Bluetooth, or a near-field communications technique. The PAMS server sends commands to the indicator to display a particular indication. In some implementations, the status is indicated by a color change, such as from clear to black, or by the presence or absence of a color at a particular place. For example, a swatch of fabric on a white designer dress can turn brown if the dress is reported as stolen. Alternatively, the indicator may include a display that displays relevant information, such as displaying a status of the article. For example, the indicator may be made to display the words "stolen" or "lost", or an absence of an image if the article is recorded as lost or stolen in PAMS, and words such as "ok" or a picture, such as a manufacturer's logo, if the article is recorded as authentic.

Example Non-Limiting Key Device(s)

The non-limiting key device(s) of non-limiting embodiments herein verify aspects of the specific article itself. In some non-limiting applications, a key device is associated with a protected article such that the association cannot be modified, removed or altered without changing the response of the key device to an electronic interrogation requesting the current indicia or damaging the protected article. For example, a key device may be embedded within a structural or decorative element of the protected article in such a way that removing the key device damages or reduces the value of the protected article (in the same way that removing an indicator damages or reduces the value of the protected article). Alternatively, the key device may be attached to the protected article in such a way that its removal leaves damaging traces or residual on the protected article, marking and devaluing it. In other alternative examples, the key device is affixed to the protected article in such a way that removing the key device or altering its physical attachment breaks or changes the nature of an electrical connection between the key device and the protected article, or changes the one or more physical attributes of the protected article that are sensed by the key. Both of these types of changes have the effect of changing the physical attributes of the protected article measured by the key device, and thus altering the indicia values calculated using the PUA information. In still other implementations, keys are associated with inherent immutable characteristics of the article itself.

A key device is electronically or otherwise interrogated by various components of the system and provides a unique set of responses in response to this interrogation. Multiple request/response sets may be used to assure that the protected article and the key device are still physically associated and co-located. The information the key provides based upon the PUA of the protected article in its responses are called indicia values. In some implementations, the responses to the interrogation are based solely upon attributes of the protected article and/or the association between the protected article and the key. In other implementations, the interrogation response is based only in part upon these attributes and associations, and are combined with other aspects of the key device that demonstrate the integrity of the key and/or the protected article and/or the association between the key and the protected article. Removing the key from the protected article, tampering with the key, or even tampering with the key/protected article association, changes the responses provided by the key to the interrogation. The indicia returned by the key may be used as an authenticator for the protected article. In other words, if the key is present and responds with a correct set of indicia in response to the electronic challenge, the protected article may be presumed or inferred to be present and authentic.

A key in one example non-limiting embodiment is an assembly of components comprising a key controller and the one or more sensors associated with that key controller. A single key controller may be connected to one or more sensors and manages these sensors by setting their parameters and reading values from the sensors. Each sensor differentiates at least one type of protected article physical attributes that can be measured, e.g. electrical properties, optically distinguishable features of a material (e.g., paper, leather, fabric or other materials surface imperfections or variations). The key controller interfaces the key assembly to one or more communicators (and/or wireless networks) and is connected to the sensors using appropriate wires and circuits. The key controller may be connected to a sensor using wireless means. The key controller comprises a processor executing one or more programs to convert sensed information into indicia unique or distinctive to the protected article, executing one or more programs to control and manage the sensors, and programs that provide the communications interface with other components of the PAMS in order to communicate indicia and receive challenges and/or instructions.

Figure 9A:
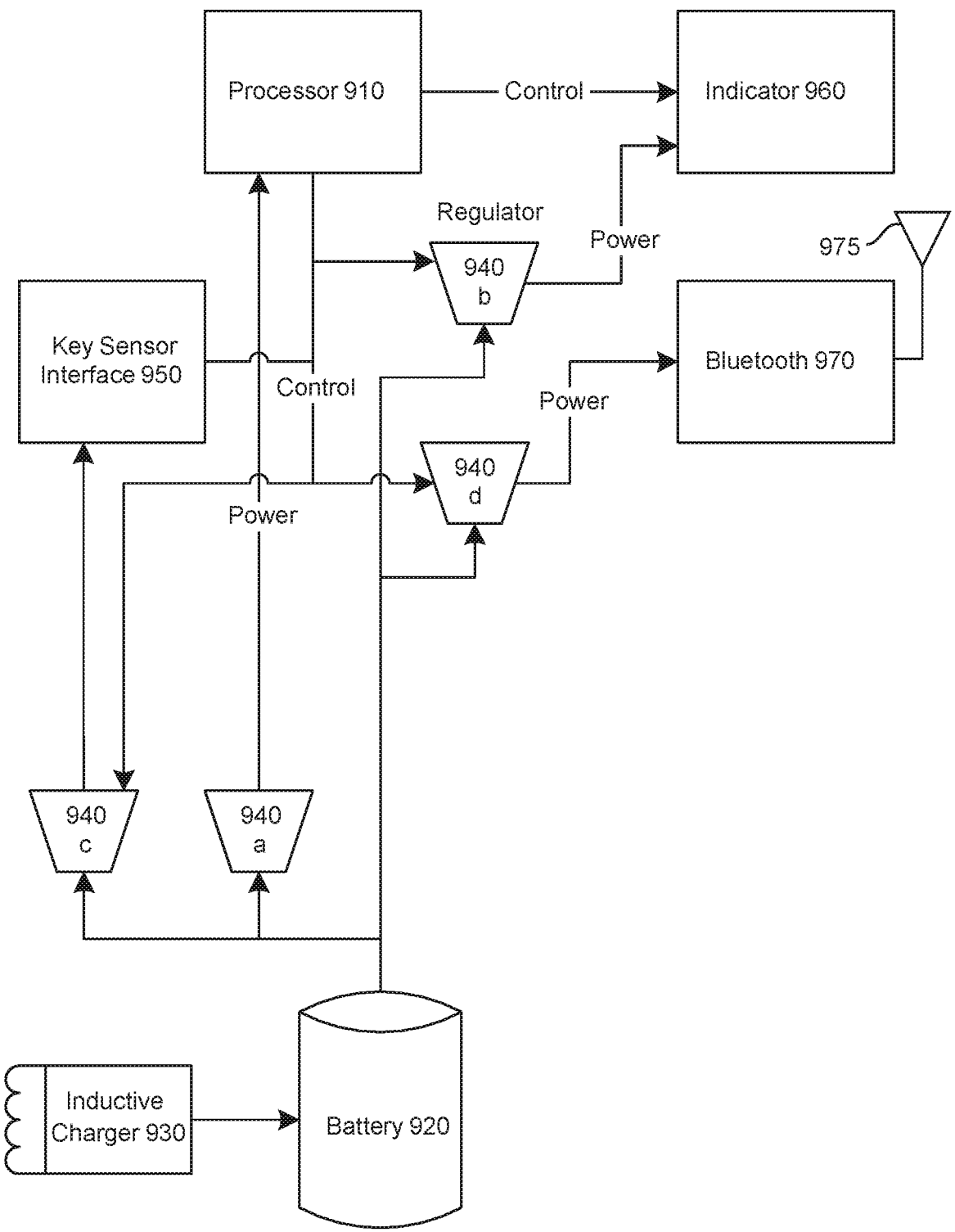
FIG. 9A illustrates a block diagram of an exemplary key controller.

An illustrative key controller is shown in FIG. 9A. The key controller comprises an embedded processor (910) such as a CPU or FPGA and one or more memories, such a RAM, ROM, or EEPROM that store the control program executed by the processor. Both persistent and transient memories are contemplated as part of the key controller. The processor is powered by a battery (920), via regulator 940a which is charged from a charge source, in this example, an inductive charger (930). Other means of keeping the battery charged are envisioned, such as a piezo-electric or movement-based charging, solar charging, electrical contacts, or any other contacting or contactless charging.

Connected to the battery and the processor are a number of processor controlled voltage regulators the processor controls in order to provide a varying amount of power from the battery to one or more interface components. These regulators include regulator 940b, which controls the power to one or more indicators (960), and regulator 940d, which controls the amount of power to a low power Bluetooth communications component (970). The Bluetooth communications component includes one or more antennas (975). In order to save power, the processor may periodically control the regulator to turn off power to the Bluetooth communicator component and then turn on the power to the communication component when it needs to communicate with a PAMS management server or communication controller. The indictor(s) and Bluetooth communications component are additionally controlled by the processor, for example, to set the value on an indicator display, and to control the content of communications, respectively.

Also connected to the processor and powered from processor controlled regulator (e.g. regulator 940c) are one or more key sensor interfaces (950). A key sensor interface provides the interface between the processor of the key controller and the hardware that measures and reports one or more physical attributes of protected article to the processor. Examples of key sensor interfaces include a resistive mesh interface and an optical sensor (both described later). The key sensor interface is controlled by the processor using separate control circuits, as illustrated in the figure.

Figure 9B:
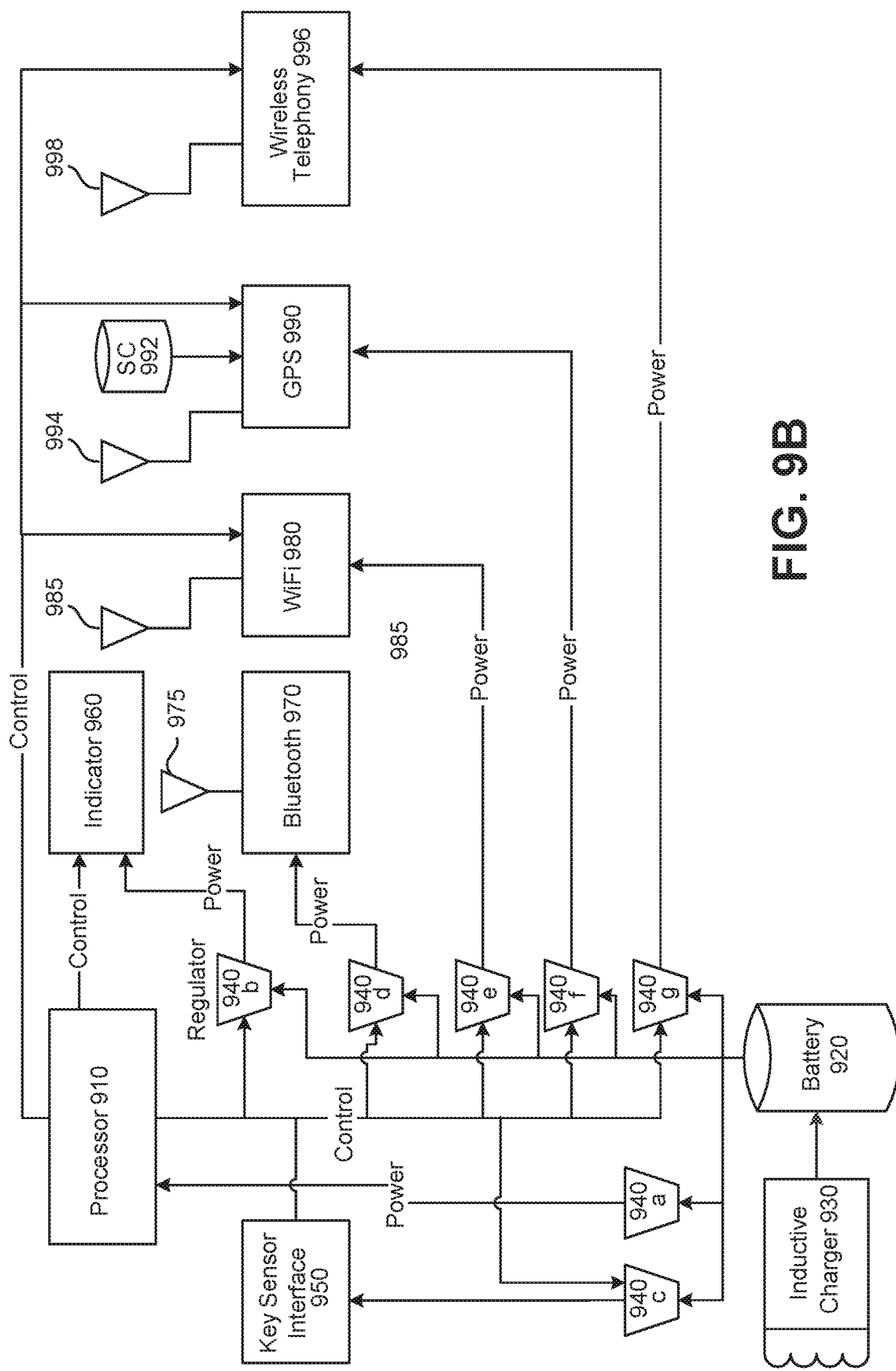
FIG. 9B illustrates a block diagram of an exemplary integrated key controller and communicator.

FIG. 9B illustrates a implementation of an integrated device, comprising key (e.g. controller and sensors), a communicator, and zero or more indicators. The integrated device includes the circuitry of the key controller of FIG. 9A, and adds additional regulator controlled communication components for wireless communication, including WiFi controller 980 and antenna 985, GPS (Global Positioning System) circuit 990, with active antenna 994 and super capacitor power backup 992, and wireless telephony circuits (such as a CDMA or GSM chip set) 996 and its associated antenna(s) 998.

Supercapacitor 992 is charged from the power provided to the GPS circuit and provides a small amount of power when the battery is logically disconnected in order keep the GPS configured. This permits the processor to deactivate and reactivate the GPS controller and its active antenna using a regulator (940f) without losing the GPS initialization. This results in substantial time and power savings when reactivating the GPS geolocator.

In some implementations, the power control and regulator for the communication circuits and key interface sensors may be omitted without loss of functionality as the controlled circuits may not require external power to function (e.g. they are powered from the control inputs).

While communicating with the communicators, a key may be identified by a unique identifier (e.g. a key ID) or a derived unique identifier (such as the values of a selected set of indicia). It is preferable in some embodiments for ease of manufacturing and retail sale of the protected article that a key not require factory programming to include unique information such as public/private key pairs and key-specific globally unique identifiers (e.g. GUID); rather that these items be internally generated during key initialization. An integrated device may have a single unique identifier for the device, or may have unique identifiers for each of the integrated components (e.g. one unique ID for the communicator, one for each key controller, one for each indicator). Alternatively, the device ID, cryptographic information, and unique identifiers, and the like may be unique only for a specific registration between a key device and a management server.

Example Indicia

Each key, as part of its interactions with its connected sensors, may generate a plurality of indicia. In many cases, it is preferable that a key produce a large number of indicia so that it is harder to "spoof" indicia returned in response to a query from a management server. A management server may request one or more indicium from a key by sending a request to the key including the indicium tags for the requested indicia. The key device responds with the requested indicium values.

The key controller manages and generates indicia. Indicia have the following attributes:

Repeatable—indicium values are repeatably generatable from physically unclonable attributes of the protected article Large, sparse range Uncorrelated to observable operations by the key.

Indicia have two parts: a tag and a value. The tag is a unique (to the device) randomly generated (at initialization) value that is used to identify an indicia value. The value of the indicia is the result of processing protected article attributes through a function that uses as input the PUA and key device information that is generated during initialization. In some embodiments, the function is a null operation, and the indicia value returned is the actual PUA read from a key device sensor. The function may use information unique to the current initialization of the key device in combination with a collection of PUA values that are passed through the function (such as a hash or encryption algorithm seeded with initialization specific starting values) that permutes the input set of PUA values into an apparently random string of bits. This set of bits, while apparently random, is repeatable and may be compared to previously stored values, or may alternatively be decoded by a recipient to yield a starting PUA value (if encoded using an encryption algorithm).

Each indicium is assigned a unique tag value (e.g. indicium tag), which may be used in subsequent operations to instruct the key as to which indicium is to be determined or to identify the key and indicium when reporting from a plurality of keys. The key controller, in effect, maps the requested indicium tags to a value computed using a specific set of measurements taken from an attached sensor. Indicium tags are typically randomly created by the key at initialization or may be pre-assigned based upon the key controller indicium generation algorithm Thus, an indicium tag may represent one or more specific sensor measurement(s) from a set of sensor measurements known only to a key device. In short, the indicium tag is an ID that could refer to physical position, sequence in time, sequence in order, or any other arbitrary identification that distinguishes one indicium produced by a key from another indicium produced by the same key device. From one use of the key to the next, the meaning of the tag does not change, however, tags are unique to a specific initialization of a key device. One challenge in creating keys is that they preferably generate a sufficiency of indicia and that the range of the generated indicia values is preferably fairly large, non-clustered, and sparsely populated. A large unclustered range makes the returned indicium value distinct from other indicium values, and thus harder to guess. Sparsely populated ranges decrease the likelihood of a chance of a random guess being successful.

A second challenge is that an attacker should not be able to determine valid indicium tags from invalid indicium tags based upon the response of the key device.

A third challenge is that an attacker should not be able to determine what is being measured by the key device/sensors in order to produce indicia results. This limits spoofing of inputs to the key device.

A fourth challenge is that the indicia returned by the key device is repeatable over time A fifth challenge is that the key device, the indicia it generates, and its association with a protected article is able to stand up to changes to the protected article as a result of everyday use and cleaning Thus, the key device should respond with indicia that can be repeatably created within acceptable measurement limits when the protected article is in use within its normal everyday usage, and after normal cleaning processes are performed. For example, a key device associated with a high value dress must be able to operate to produce verifiable indicia during and after normal use (wearing) of the dress and after any required cleaning of the dress (e.g. washing or dry cleaning).

One method of attacking a key might be to communicate with the key device and observe the results, both in the responses to the communication, and in the key device interaction with the protected article. Key device communications are designed to defeat these types of observations. Key device operation is similarly designed to defeat correlation between a specific requested indicia tag and the externally visible actions of the key device and its sensors.

First, the key maintains an internal cache of "valid" indicia values (see indicia table example below). For a request for a valid indicium tag (e.g. one that is known to the device), the key either selects the value from the indicia table and returns that indicia value without accessing a sensor (or randomly accessing one or more sensors to obfuscate its actions), or accesses one or more sensors (including accessing some sensors and ignoring the results) and computes a new indicium value. For invalid indicium tags, the key computes a random indicium value and returns that value. If space permits, the invalid indicium tag and return value are stored in the indicia table and a counter of invalid indicium requests is incremented. If the counter reaches a specified threshold, the key device may take additional actions, including notifying the PAMS server that it is under attack or setting an indicator to indicate that the key device has been attacked.

By caching known indicia and only regenerating the indicia for some of the requests, the key device breaks any causal relationship between a particular indicium tag and a particular sensor activity and/or sensor response.

By reading some or all of the sensors each time a requested sensor value is obtained, and then selecting a subset of the sensor readings to use in the sets of inputs for producing the indicium value(s), the key device breaks the relationship between particular indicium and the sensor value(s) it uses as inputs.

Second, the key device creates new random indicium tags for each instance of the key (when a key device is associated with a PAMS server). This limits attacks based upon the indicia tag space and removes attacks against a second key device based upon known indicia tags of a first key device.

Third, the key device associates (maps) the indicia tags to the calculated indicia values differently for each key device. This limits the ability of an attacker to guess at the settings or readings associated with a particular indicium tag (or tag position), and further prevents attacks across key devices based upon this information.

Indicia Table

The key controller maintains at least one internal table of indicia information for use in computing, responding to indicia requests, and validating indicia. Preferably, one table is maintained for each PAMS management server that the key device is registered with. The indicia table contains information required by the key device to respond to indicia requests by a PAMS management server. Example table columns are illustrated below:

| Column | Notes |
| --- | --- |
| Index | Index of indicia tag. Set to −1 for cached "bad" tags. |
| Indicium tag | Randomly generated indicium tag |
| Indicium value | Calculated indicium value |
| Sensor ID | Sensor ID (for key controller use) |
| Sensor parameters | Sensor parameters (for key controller use) |
| Indicium algorithm | Identifies indicium calculation algorithm to use |
| Timestamp | Timestamp of last use |

The index column indicates the indicia tag order for certain communications with the PAMS management server. The index column is set to "−1" for cached indicium tags that do not correspond to a known (computed by the key device) tag (e.g. a bad tag or probing request from a potential counterfeiter).

The indicia tag is a random value established when the controller is initialized. The values in the column are unique to the key.

Indicia values are generated by a key device using one or more unclonable physical attributes of the protected article as inputs. Indicia are generated by the processor of the key device, executing program code stored in a memory of the key. The program code reads unique features/properties from one or more sensors and generates one or more indicium values from these features/properties. In general terms, indicia generation starts with a list of features/properties (e.g. PUA) of the protected article that have been determined by one or more sensors. From this list of features/properties, the indicia generation algorithm selects one or more features/properties to use as input into the indicia generation algorithm Not all features/properties need to be used in indicia generation. The features/properties selected may be a single feature/property, may be a set of features/properties, or may be all of the features/properties. The indicia generation algorithm then selects an order for these selected feature/properties to be used in indicia generation. Permuting the order greatly changes the resulting indicium values. For example, a selected order may be ascending in the order presented, may be descending in the order presented, may be alternating feature/properties in the order presented, etc. The same set of feature/properties may be ordered in different ways to produce different indicium values, increasing the number of indicia that may be generated from a set of features/properties.

The feature/properties are passed thru a position sensitive function to compute the indicium value(s). Examples of such algorithms include cryptographic hashes such as MD5 and CRC. The algorithm is position sensitive so that altered order of inputs produce differing results, permitting each set of feature/properties to be used to produce many indicia.

For example, a simple indicium generation algorithm is a CRC-16 across the bytes of an array for feature/properties. Consider the array of four feature/property (PUA) values

| Index | PUA value |
| --- | --- |
| 0 | 0x0001 |
| 1 | 0x0002 |
| 2 | 0x0003 |
| 3 | 0x0004 |

A CRC-16 calculation of the bytes in increasing index order yields a different result than a calculation using bytes in decreasing index order. The table below illustrates the wide variance in an indicium values calculated using a CRC-16 calculations based upon feature/property (PUA) input order.

| Input order | Computed Indicium Value |
| --- | --- |
| 0, 1, 2, 3 | 92CA0597 |
| 1, 2, 3, 0 | EBD64F7E |
| 2, 3, 0, 1 | 921FF29C |
| 3, 0, 1, 2 | EB03B875 |
| 3, 2, 1, 0 | 7FCD8A39 |
| 2, 1, 0, 3 | 6D1C0D0 |
| 1, 0, 3, 2 | 7F187D32 |
| 0, 3, 2, 1 | 60437DB |
| 0, 2, 1, 3 | D72CC11E |
| 2, 1, 3, 0 | 9D9E2F53 |

The other input order permutations are possible.

Different algorithms, such as MD5 hashes, produce longer output strings on small input sizes.

In general, the above table illustrates how a relatively small number of feature/property values can be used to produce a large number of unique indicia that uniquely identify a protected article.

The sensor ID column identifies the sensor to be used by the key controller.

The sensor parameters column identifies the parameters to be used to configure the sensor. The sensor parameters vary based upon the type of sensor, and may be randomly selected for some types of sensors. For example:

For optical sensors, sensor parameters may include lighting, sensor exposure, and lens settings.

For resistance sensors, sensor parameters may include the settings for the control pins (e.g. which pins to set to a specific voltage, which pins to set to ground, which pins to leave unconnected).

The indicia algorithm column identifies the indicia algorithm and any necessary parameters to that algorithm. For example, this column may identify CRC-16 or MD5 as the indicia calculation algorithm to use, as well as any required initialization parameters for that algorithm.

The timestamp column identifies the last time a particular indicia tag was queried by a communicator or PAMS server. This timestamp is used to determine whether an indicium should be recalculated (e.g. rereading the sensors) or if the cached value may be used.

Mapping of Indicia Tags to Indicia Table Entries

An optional feature of the key in some embodiments is that it maps the indicia tags to indicia table entries on an instance specific basis. This breaks any relationship between the position of the indicia tag in the indicia table and any underlying hardware configurations. Alternatively, the indicia table may be reordered after it is populated (perhaps by sorting in ascending indicia tag value) to break any table/hardware dependent orderings.

Figure 10:
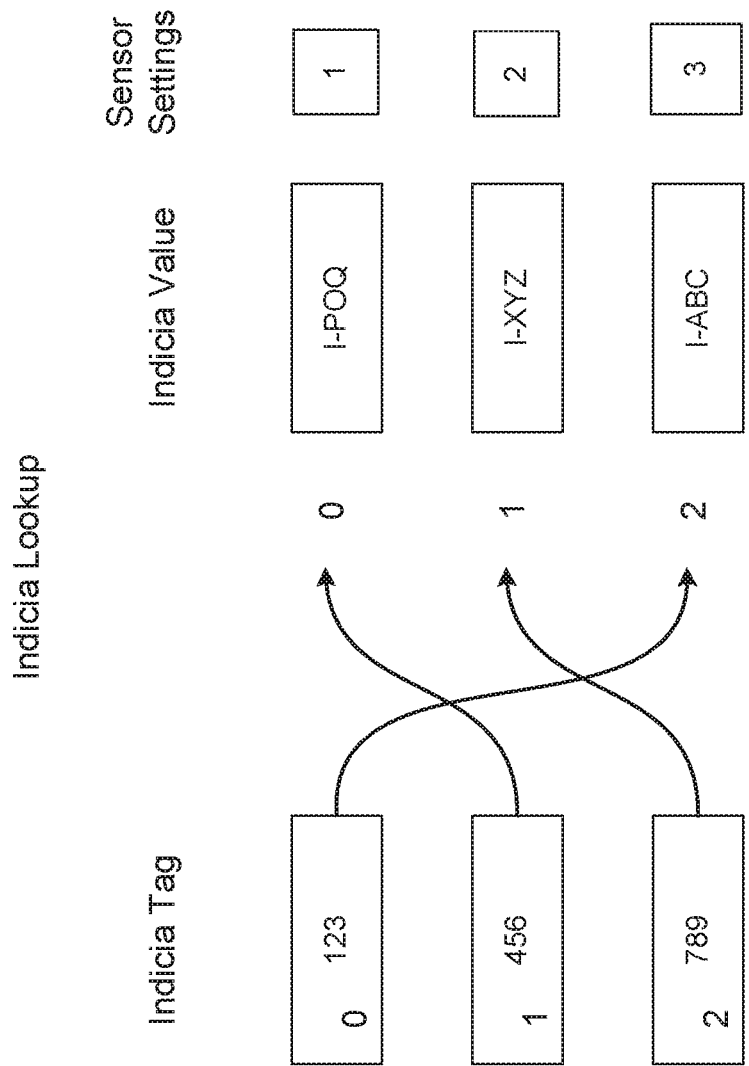
FIG. 10 illustrates an example indicia reordering scheme.

FIG. 10 illustrates an effect of this ordering and how it masks the underlying sensor mappings.

It is desirable that the key is able to withstand tampering or to fail in known ways in response to tamper detection. It is further desirable that any such key device failure is detectable via the normal querying and communication of the key devices.

Example Types of Keys

There are several types of keys envisioned, depending upon the type of protected item that they are associated with, the type of sensor required, and how the key device(s) are integrated with the protected item.

Resistive mesh key

Randomly printed conductive key

Variably conductive adhesives

Optical Sensing key

RFID key

Creation of a Resistive Mesh Key

The process of creating a resistive mesh key creates a device that exposes article-specific electrical properties (e.g. resistance values, voltages) that are measured by the key's sensors in order to expose the protected article unique attributes. Resistive mesh key techniques are useful for detecting the electrical characteristics of one or more aspects of the protected article. A resistive mesh key comprises an electrical properties sensor (e.g. a resistance sensor, a voltage measurement sensor), a mesh of measurement points between which the electrical properties varies based upon attributes or aspect of a protected article (a resistive mesh circuit), and processing techniques provided by the sensor and/or key controller to expose and read the unique values produced by the resistive mesh circuit.

Resistive mesh keys are useful when the protected article has independent electrical characteristics that vary with the construction of the protected article and that can be measured, or for when a component of the protected article that has these electrical characteristics is embedded within solid components of a protected item, such as purse bottoms, clasps, strap mounts, shoe bottoms and heels. Other places that resistive mesh keys may be applicable are dictated by the design of the protected article and may be utilized.

A generic electrical properties sensor that operates with resistive meshes, and in general, with resistance networks provides a common circuit for determining properties of resistance meshes and electrical networks.

In an embodiment, the electrical properties sensor is able to determine electrical properties by applying a known voltage, ground, or resistance to one or more leads (leads 220 of FIG. 3A) and measuring the resulting resistance/voltage on a second lead. Many embedded microcontrollers provide the analog/digital interfaces to directly power these leads from the embedded controller. Alternatively, the circuits for powering these leads are well understood and may be added by the key designer as needed.

Generally, each lead in a set of leads are connected to one of: ground, a known supply voltage (e.g. Vcc), or a high resistance (high-Z). The body of the resistive network produces a resulting voltage and the resulting voltage is read off a second lead. This, in effect, uses the electrical characteristics being measured as a voltage divider, which has many advantages. First, thermal changes in resistance are cancelled out, which eliminates temperature-based repeatability problems. Similarly, changes in voltage (for example, caused by low battery) are also cancelled out. Lastly, it produces a large number of testable combinations, with an 8 lead arrangement yielding at least 15446 possible combinations and a 10 lead arrangement yielding at least 186600 combinations.

In an embodiment, the microcontroller of the key controller (at initialization) randomly determines the initialization values associated with each of the leads connected for electrical properly measurement. The initialization values define whether each of the leads is:

0—set to ground

1—Set to Vcc

2—Set to hi-Z

3—Use pin as analog input (e.g. connect to A/D converter to read value from it).

The initializations values can be encoded and stored as two bits per lead, or be stored as specific voltages/resistances to use.

The randomly generated initial values are checked for validity (at least one ground, at least one Vcc, and exactly one analog input), and for results that are reproducible (e.g. not too close to a measurement boundary condition) and invalid entries are regenerated if necessary until a valid initialization vector is created. The validated initial values are stored in a memory of the key for later use. Spoofing values may also be generated and stored using similar means.

By applying mathematical techniques during initialization and simple testing of the resistance network, we can characterize a start condition and measurement thresholds that will give sufficient attributes for use in creating indicia, and store those starting conditions, measurement thresholds, and lead settings as initial values. Alternatively, we can store seed values to a repeatable algorithm for computing the lead settings as the initial values. Combinations of initial values that produce invalid or unrepeatable results can be discarded in favor of values that produce valid, reliable results based upon a lead value filter. These techniques for initialization makes the electrical properties measured for a protected article unpredictable between keys, but repeatable for any given key.

In an embodiment, the electrical property measurement leads are extended from the integrated device controller/measuring resistance array to a set of contacts attached to the protected article. These contacts may be in the form of a connector, a set of contact plates or a set of pins, depending upon their intended use.

Figure 3B:
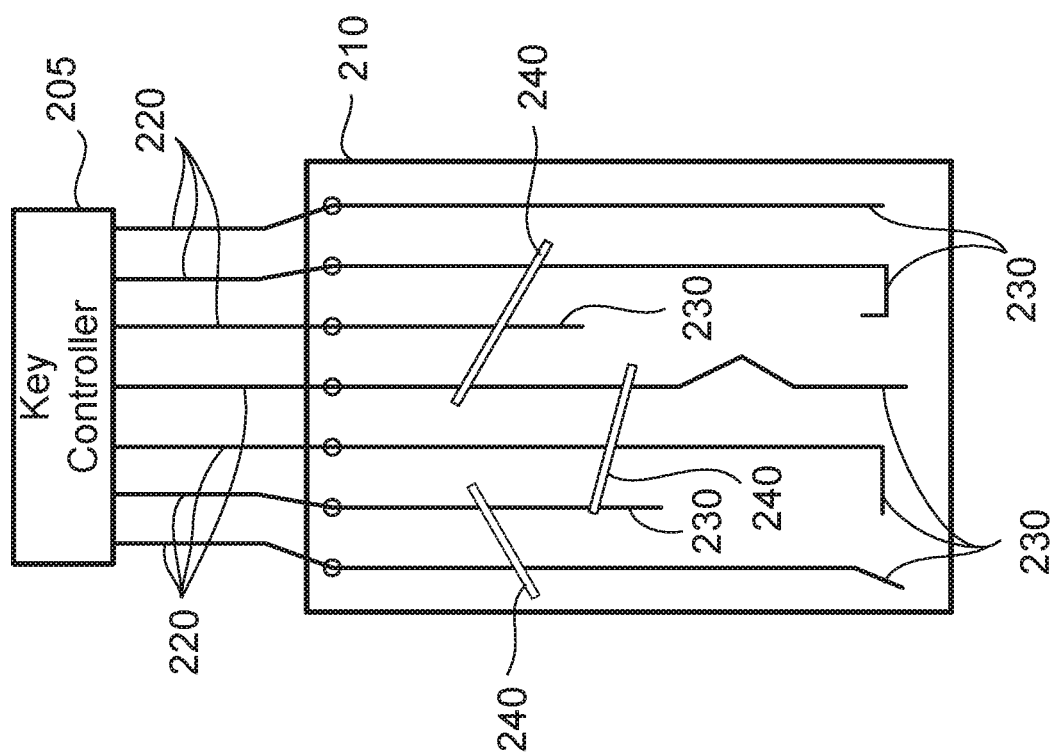
FIG. 3B illustrates a top view of an exemplary resistive mesh key.

A first example of a resistive mesh key is shown in FIGS. 3A and 3B. In FIG. 3A, a schematic of a resistive mesh key is shown in side view. It comprises key controller (205), resistive mesh key circuit board (210), with contact/connector (220) attached to the board and electrically connected to each of a plurality of traces (230) etched onto it. The key controller (205) comprises a key sensor interface that further comprises a sensitive electrical properties measuring circuit, a driver circuit that applies known electrical properties (e.g. voltages, grounds, resistances) to at least one component of the resistive mesh. In an embodiment, an optional multiplexor selects various electrical paths through the circuit by selecting which pins of the contact/connected are being measured. In an alternative embodiment, no multiplexor is used and defined inputs are applied to all but one of the leads connected to the circuit, and the remaining lead is read for the value of the entire circuit.

In a first embodiment, a variably resistive mesh circuit is implemented as a circuit board (210) that preferably has a plurality of traces, each trace electrically connected to a different pin of the key connector. Conductive fibers (240) are randomly scattered over the traces to provide intermittent electrical conduction between each of the pairs of traces. In essence, the fibers form bridging elements that electrically bridge the traces on the circuit board at randomly selected locations with material of varying conductivity. In an embodiment, the conductive fibers comprise carbon fiber of various lengths and diameters. The circuit board, traces, and conductive strands are encased in an epoxy or other non-conductive polymer coating (250) to affix the strands to the traces, prevent movement of the conductive fibers, and to limit tampering with the resistive mesh key.

In a first embodiment, FIG. 3B shows a schematic of the exemplary key in top view.

In another embodiment, a variably resistive mesh circuit may be implemented by printing either the conductive traces and/or bridging elements of a resistive mesh key chip using one or more conductive inks. The traces may be pre-printed on the resistive mesh chip and only the bridge elements printed in order to produce the variable electrical attributes. Alternatively, both the traces and the bridging elements may be printed using a pattern of the traces and bridging elements selected by the printing program. This selection may be random or may be based upon one or more templates along with a randomization factor. The placement and electrical characteristics of the printed components of the chip may be varied by adjusting the line size (width, thickness) and ink characteristics using the printing program. The printing of the "bridging" elements may use different types of ink or by varying the ink used to include inks with differing electrical characteristics in order to further alter the electrical characteristics of the printed resistive mesh circuit.

In an implementation, a circuit board is created with traces and connectors (and other parts as necessary) as described above. Conductive material is spattered (or printed in a random spatter-like pattern) on the circuit board to form conductive paths between the traces, and the resulting circuit board is coated with an epoxy or polymer as described above.

The placement of the bridging elements in a resistive mesh circuit using a naturally random process such as spattering, where the conductive ink is spattered onto a substrate with conductive traces on it, produces unique PUAs. Spattering produces a random pattern of the conductive ink over the traces in order to produce a circuit with essentially random characteristics. Other methods of applying ink patterns are possible.

In alternative embodiments, a variable resistive mesh circuit in the form of a paste or solid may be created by partially mixing conductive elements into a settable matrix, such as a polymer or epoxy. In these embodiments, conductive elements such as carbon fiber or metallic beads are mixed into a matrix compound, such a polymer, liquid plastic resin, or other similar compound, and the resulting compound shaped, poured, or cast into a desired shape, where it sets into a solid with variable electrical properties at different points in the solid. The key controller and leads are either attached to the resulting solid, are embedded within the matrix, or are partially inserted into the matrix before it hardens. The electrical properties of the matrix/conductive element solid will vary naturally due to the incomplete mixing of matrix and conductive elements, with multiple paths of variable resistance being formed within the resulting solid. The solids may be formed and/or cast as parts of the protected article as desired.

Alternatively, the same technique may be used with a glue-based matrix and conductive materials in order to make a variable resistive mesh glue layer. A variable resistive mesh glue layer may take the place of any glue or adhesive used in the construction of a protected article, or may be used to affix portions of the PAMS system to a protected article.

Each of these variably resistive mesh circuits is operated by the key controller by applying a known voltage or current (generically, power), ground, or a known resistance to one or more portions of the circuit (e.g. by powering one or more lead(s), grounding one or more lead(s), or connecting one or more lead(s) to a known resistance (or leaving them unconnected for infinite resistance)) and measuring the electrical characteristics of the variably resistive mesh circuit by measuring the electrical characteristics from a second lead. A resistive PUA is one of these measurements.

Each lead may be set by the key controller to a specific voltage, to ground, or high resistance (e.g. unconnected), or may be connected to a sensor that reads the electrical characteristics of the lead based upon the sensors initialization values. For example, with a first setting of the key controller, lead 1 may be powered with +5V, and lead 2 may be read; while in a second setting, lead 2 may be powered with +5V and lead 1 may be read. In still another example permutations, lead 1 may be set to ground, lead 2 may be set to +5V, lead 3 may be left unconnected, and lead 4 may be read. Based upon the number of leads available, a large number of permutations of powered, grounded, and unconnected leads may be made.

In a first mode of operation, the key operates by applying a voltage to each pin of the connector and reading the resulting electrical characteristics (e.g. voltage/resistance) from the other pins. In some implementations, digital to analog and analog to digital signal converters (not shown, in the key controller logic circuit) and communication components are made a part of the key. The resulting set of readings provides a unique signature of the electrical characteristics of the protected article as measured by the key device that is hard to replicate and replay.

In a second mode of operation, the key power with known voltages on one or more measurement leads and the resulting voltage from the measured electrical circuits is created by the mesh read using another lead. Each of the analog conductive paths through the resistive mesh will contribute a portion of the resulting voltage being read, and overall characteristic of the resistive mesh computed. Changing the resistance of any one of the resistive paths through the resistive mesh will change the resulting voltage measurements.

The key controller operates by determining one or more lead configuration settings, associating the determined settings with a specific indicia request, and saving these settings within the controller. Each time the key controller is asked for a particular indicium, the key controller configures the measuring leads in accordance with the settings for the requested indicia and reads the resulting value(s) from the circuit. The read value(s) are used as an input to an indicia generating calculation performed by the key controller. Again, changing or tampering with the resistive mesh circuit will result in changed readings, which in turn will result in different indicium being generated.

Alternatively, indicia generated from an electrical properties key may be derived by taking a set of readings from various leads associated with a set of selected settings. In this embodiment, typically, each reading of the key requires a plurality of settings for each of the leads and reading the electrical properties (e.g. the PUA) for each setting by the processor of the key, with the PUA results stored in an ordered list or array of readings. This list of readings is then used to produce the indicia for the key using selection of specific PUA using an algorithm based upon the list or array and permutations of skip, and offset settings as described herein.

In an alternative exemplary embodiment, a random number generator and initial value seed may be used by the processor to generate the list of electrical property settings for each lead, with the resulting set of settings tested to ensure that exactly one lead is selected for reading, at least one lead is selected with non-zero power input, and all remaining leads are set to a power input, a resistance, or ground. The resulting list of settings is then used to generate the requested indicia.

Integration of Key into Protected Article

The resulting key may be made a part of the protected article, cast into parts of the protected article, or may be otherwise integrated in such a way as to make it hard to remove the key from the protected item without damaging one of the key or the protected article.

In some implementations, a resistive mesh key may be printed upon a component that is integrated into the protected article, or may be printed directly upon the protected article.

A resistive mesh key may be constructed as part of the protected article in a way that prevents the resistive mesh key from operating or that will change the PUA measurements provided by the resistive mesh key if the protected article is tampered with. In a first example implementation, the resistive mesh key may be integrated as part of a hard sheet-like component of a protected item, such as the bottom of a purse or handbag, a clasp backing plate, and in similar applications. The resistive mesh that is measured by the resistive mesh key is provided by the material making up the portion of the protected article that the key is attached to, e.g. the material making up the bottom stiffer for a handbag or the backing plate of the clasp.

Alternatively, the key may measure the characteristics of at least some of the material that the protected article is constructed of, such as the resistance of a lining within a purse or courier bag. In each of these cases, the key is thus measuring at least an aspect of the protected article when determining the metric used, in part, to create indicia. A key may similarly measure the one or more electrical properties (e.g. resistance, conductance, capacitance) across an adhesive layer, clasp, closure, or seal of an protected article, which determines whether the clasp or closure has been opened and/or a seal broken, and the subsequent indicia used to determine if the measured part of the article has been tampered with or broken since the indicia were originally created.

Figure 4:
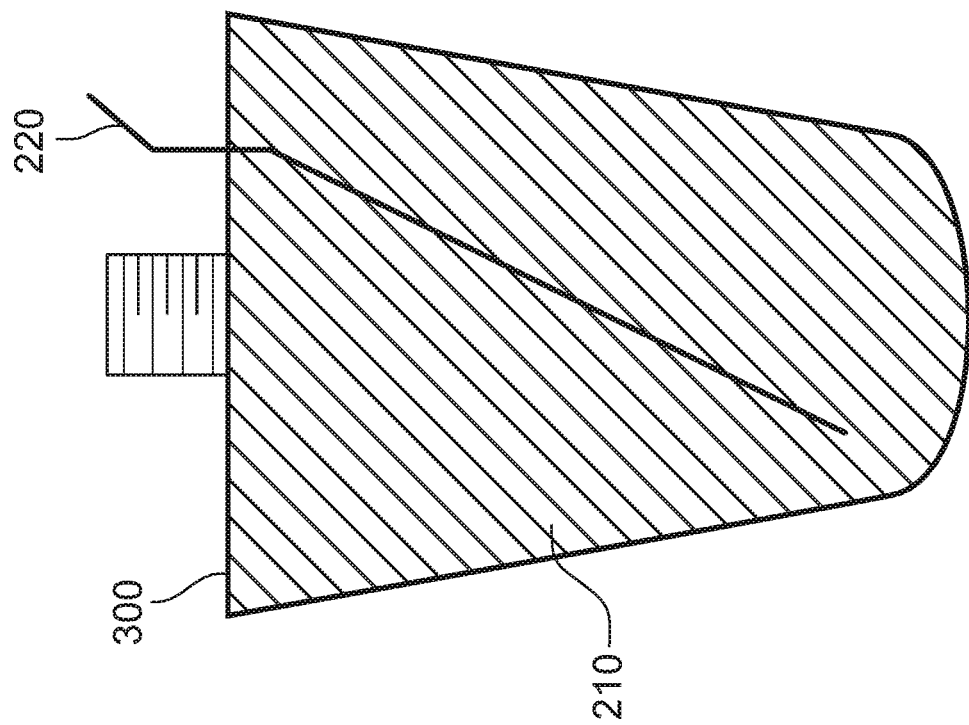
FIG. 4 illustrates an exemplary implementation of a resistive mesh key embedded within a cast protected article component (foot of a purse).

A resistive mesh key may be constructed within an integral part of a solid component of a protected article, such as being cast into heel of a shoe or molded into a handbag handle. In these instances, the resistive mesh key electrodes measure the resistance of the solid component material cast around the key. FIGS. 4 and 5A, 5B illustrate specific integrations of keys into protected articles. FIGS. 5A, 5B illustrate various locations on an example purse that a key may be integrated. Keys may be integrated within hard components such as a backplate (440), clasp (430), foot (300), or a bottom plate (420). FIG. 4 is an example of a cross section of a key cast into a foot of a purse, and demonstrates how the key can be constructed to measure aspects of the materials used to construct a protected article. The key may be encased within the article and may take any of the forms described herein, for example, the protected article part may be cast with a variable resistance circuit in it, or if using variable resistance polymers, cast with a key controller chip embedded in it that reads the attributes of the variable resistance polymers that comprise the protected article part. Note that in each case, the key is measuring a structure that is part of the protected article and each protected article instance has structures that naturally yield different PUA, so substitution attacks against the key itself will only result in unexpected values being returned to PAMS (and the protected article failing its tests).

In cases where a key is attached to a protected article using a bonding agent, one aspect of the article that is appropriate for producing PUAs is to monitor the attachment bond integrity. If the bonding agent used is partially and/or variably conductive, a key controller with an electrical property measuring sensor interface may be used to measure the electrical characteristics across the bond. If the bond is tampered with (e.g. the key is removed from the article), the electrical properties (e.g. resistance) of the bonding material as measured between two leads will change and this change will be detected by the key. Other means of verifying the integrity of the bond may be used, such as embedded resistive wires.

Figure 11:
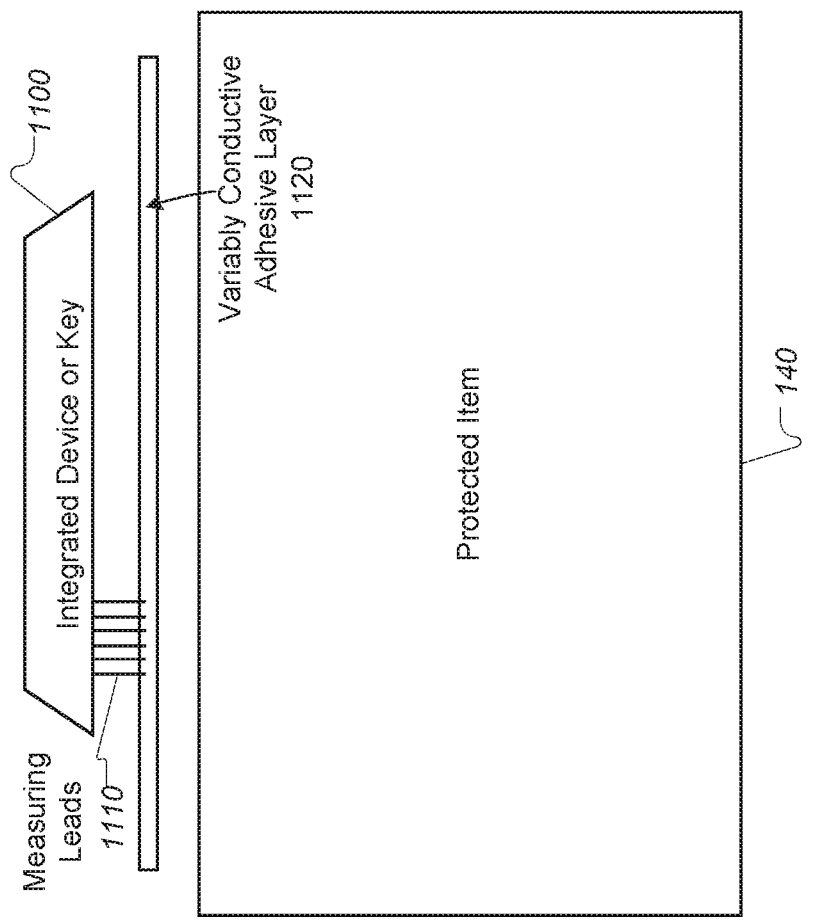
FIG. 11 illustrates an exemplary implementation of a resistance mesh key measuring the properties of an adhesive layer.

In an example embodiment illustrated in FIG. 11, the key (1100) comprising an electrical properties sensor is affixed to a protected article (140) so the measuring leads extend into a variably conductive adhesive layer that bonds the key to the protected article. The leads are positioned so they measure a resistance mesh created by the variably conductive adhesive. The resistance features of the adhesive are measured and run through an indicia generation algorithm to produce the indicia. An alternative example embodiment illustrated in FIG. 1G, a resistive mesh key (e.g. a key with an electrical properties sensor that measures resistance) is affixed to a protected article, with resistive wires extending into the adhesive layer. The resistance features of the wires may be measured and used to determine the integrity of the adhesive layer. The integrity of the circuit is what is measured, and the system relies upon the resistive wires breaking or stretching (and changing their resistance values) when the part of the protected article that they are embedded within is tampered with.

Creation of an Optical Attribute Key

In some implementations, a key may be created using an optical sensor that provides images that provide the information used to create indicia or image processing results that are used to create indicia. One approach is an optical key comprising an optical sensor that takes a macro (e.g. magnified) image of a portion of the protected article, identifies one or more features in the macro image, and then computes one or more indicia from the macro image features. These indicia are thus based upon visible attributes that are part of the construction of the protected article, such as defects, manufacturing tool marks, unique patterns of fabric weaves and stitching that collectively can uniquely identify a protected article. Alternatively, the visible attributes may be computed, such as the pattern of edges determined after processing the macro image using an edge detection algorithm. The computing of these indicia from the image are typically performed within the key using an embedded processor, memory, and image sensor of the key itself. Alternatively, the key may comprise a processor, image sensor, and communications means, and the acts to capture an image of the protected item and transfer the captured macro image to a PAMS server, where PUA are identified and indicia are calculated and compared against previously captured indicia.

An optical attribute key typically comprises a key controller and an optical sensor assembly, which further comprises a key controller controlled optical sensor (e.g. a camera chip, for visible, IR, and/or UV detection), key controller controlled lenses (focus), and key controller controlled lighting (e.g. LED or other light source). The key controller provides the logic and connections to control the operation of the optical sensor, lens, and lighting system. For example, the key controller may control the lensing in order to set a specific focus and/or magnification, and may control the lighting source to control intensity, wavelength (color), etc.

An optical attribute key may include one or more optical sensors (e.g. digital camera) coupled with lensing and lighting apparatus and oriented so that the lens and sensors are positioned to capture macro images of the protected item to which the device is affixed. In one example embodiment, the optical sensor is placed within a hardware housing so that it projects thru the bottom (the surface affixed to the protected item) of the integrated device hardware. Optional lighting, such as LEDs, may be provided by the integrated device hardware as necessary to illuminate the protected item when the optical sensor is being used. The adhesive layer is created with a void so as to not obscure the optical sensor/lens.

The optical sensor is a high resolution optical sensor, such as Sony IMX145, coupled to a lens effective to magnify and focus the image of the protected item. The lens provides magnification appropriate to the features being captured in the image, for example, one to fifty times magnification. For example, it was experimentally determined that 10× magnification provides sufficient magnification to resolve PUA features of a US passport, cover leather, and paper.

In taking a reading from a protected article, the key controller sets the optical sensor parameters (e.g. exposure length), lens settings (e.g. focal distance, magnification) and lighting conditions (e.g. light intensity, light color [wavelength]) and then captures at least one image. The key controller extracts an image from the sensor and performs one or more feature extraction algorithms upon it. Accurate placement of the sensor relative to the protected article, or an image registration and cropping step are required in order for an "apples-to-apples" comparison of the two image features. Feature extraction algorithms may be selected and tailored to the specific type of image being processed and take into account attributes such as texture, weave, grain, and similar characteristics identified in the images. As one example, ORB with hamming distance feature extraction works well on extracting the unique micro features of a US passport cover. The resulting list of features (and/or feature locations) of the image are then used, in conjunction with an indicia generation algorithm, to generate one or more indicium for the protected article. Changes to the protected article or moving the optical sensor assembly with respect to the protected article will produce a different image that has different features. This will no longer produce the same set of features during feature extraction, and which then no longer produce the same indicia.

Image registration may be performed using recognized features in the images, such as a crossed set of stitches, cuts or gouges in the material, or an edge of the imaged material, or by identifying sets of features in the images that have a similar distance and angular relationship between the features.

Figure 12:
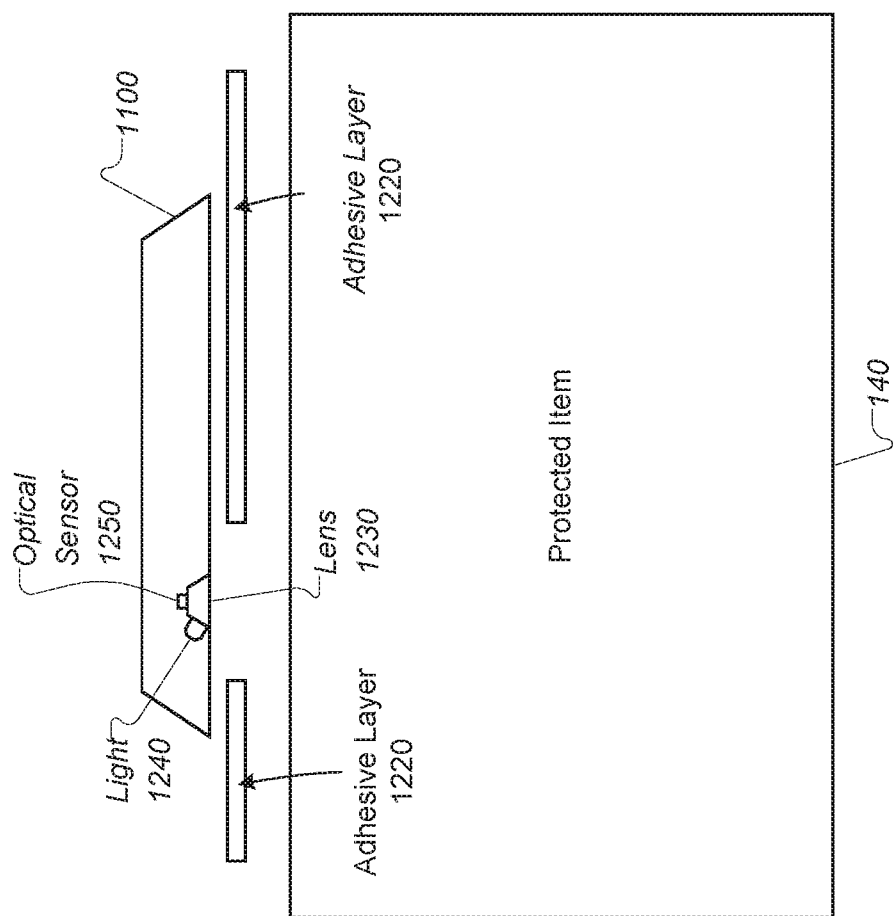
FIG. 12 illustrates an exemplary implementation of an optical properties key attached to a protected article.

In an example embodiment illustrated in FIG. 12, the optical key (1110) is affixed to a protected article (140) so the image sensor senses a piece of fabric that is part of the protected article. The key is affixed using an adhesive (1220), so that the image sensor of the key (1250), lighting (1240), and lens (1230) is pointed at the fabric that is part of the protected article. The image sensor takes an image of the fabric with high magnification under visible light, processes that image to detect the threads, weave of the fabric, and stitching in the observed fabric image, and determines features based upon: (a) fabric/thread imperfections, (b) location within the image, and (c) relationships (distance/orientation) between a stitch and the fabrics weave pattern. The average fabric image produces between 5 and 1500 uniquely identifiable features (e.g. features based upon PUA), which are then further selected and filtered down to a repeatable subset of features. These features are then processed by an indicia generation algorithm to produce the indicia Similar results have been obtained when processing images of fabric, leather, and some plasticized document covers obtained with 10× magnification and bright white lighting. Commercially produced paper images may be taken using 10× magnification and UV lighting to achieve similar results.

In another alternative embodiment, the optical key is affixed so the image sensor senses a section of a cover a protected document, such as a US Passport. Passport covers are typically a plastic impregnated fabric. The image sensor takes an image of the document cover under 10× magnification using high intensity white light. The key then processes that image to detect the pattern of cover texture manufactured into the passport cover, and determines features based upon these texture features. The features have distinct shapes, orientations, and locations within the image. An average passport cover results in the identification of between 300-1500 uniquely identifiable features. The identified features are filtered, compared against a list of repeatably recognized features, and run through an indicia generation algorithm to produce a set of indicia uniquely characterizing the key and passport association.

Figure 14A:
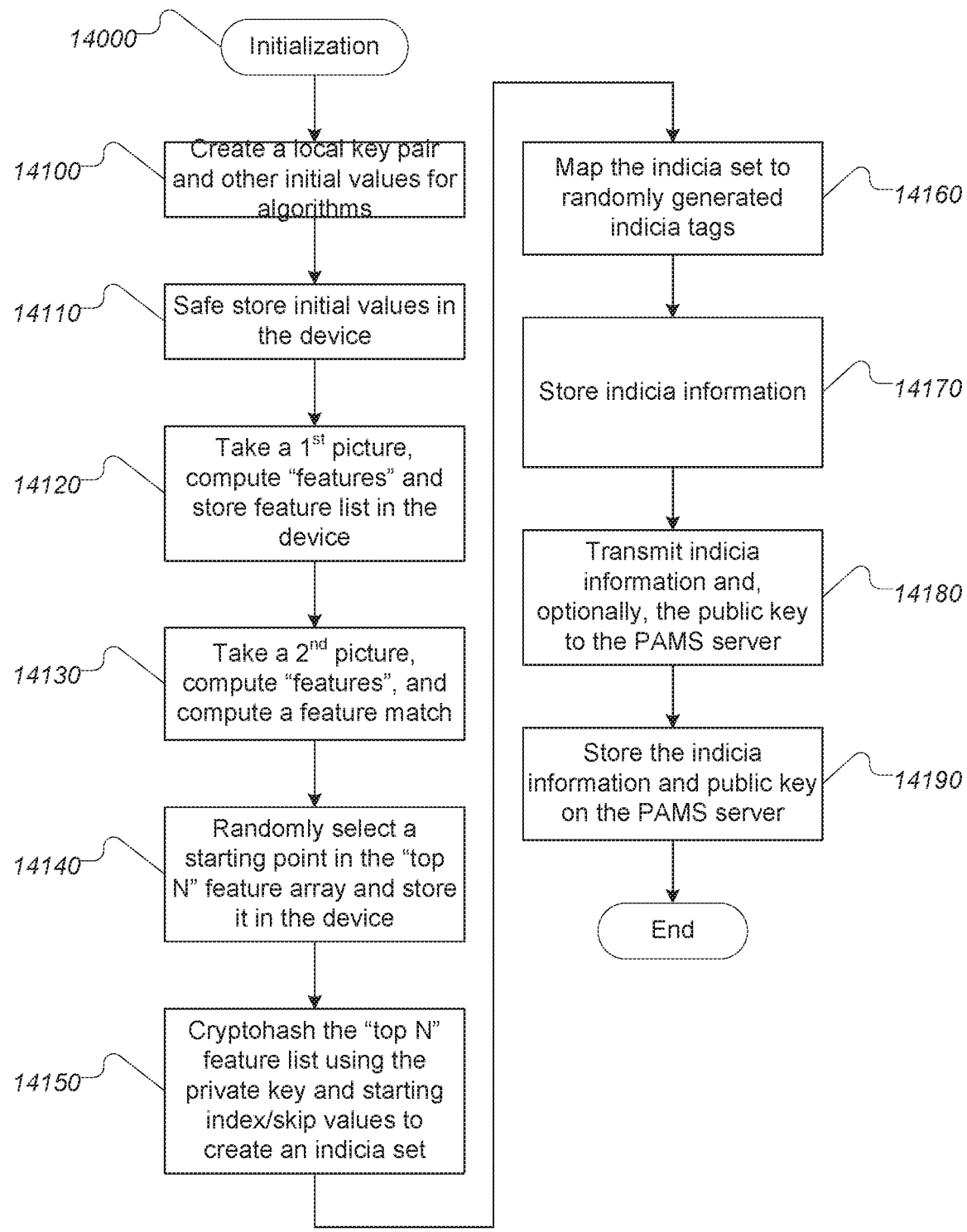
FIG. 14A illustrates an exemplary process for initializing an optical sensor key.

An optical key's initialization sequence is slightly more complex than the initialization sequence for a resistive mesh key. FIG. 14A illustrates the stepwise process of initializing an optical key. In step 14100, the optical key creates a unique local public-private key pair and saves the key pair and other initialization values in a memory of the key device (step 14110). This key pair will be used in implementation utilizing public-key cryptography. Symmetric keys may be generated using similar techniques for use in symmetric key-based approaches. In alternative implementations that do not use cryptography, other indicia generating initialization values are randomly chosen and stored in a memory of the device. Lighting settings (e.g. wavelength, intensity), lens (e.g. focus) settings, and sensor exposure times are also selected and stored as part of the initial values settings. In some cases, the determination of initial values are determined experimentally by taking multiple images under differing conditions and selecting the settings that produce an acceptable image from which repeatable PUAs may be obtained. Alternatively, the key may use a plurality of feature identification algorithms. The indicia table is also cleared and the offset/skip values chosen for each indicia slot at initialization.

The key then sets the sensor using the initial values previously stored and takes a first image from the sensor, computes its features, and creates a list of features obtained (step 14120). Features may correspond directly with a PUA of the article, or a collection of features in a particular arrangement may correspond to a PUA. The list of features determined is optionally added to the list of stored initial values in a memory of the device.

The key then takes a second image from the sensor, calculates its list of features, and creates a second list of features. Both lists of features are then normalized and ordered by location in the image. The resulting lists of features are compared to determine the features in common between the images. A high percentage of common features indicates that the current sensor and feature detection algorithm settings result in reliably repeatable feature determination. The best "N" repeatable features are selected for use in computing the indicia. "N" is selected, in part, based upon image quality, the number and quality of the features detected, and the number of features needed for indicia creation. In some implementations, the first "N" repeatable features are selected. In alternative implementations, additional processing is performed to analyze, filter, and select "N" repeatable features.

In some implementations, multiple feature detection algorithms may be used and the "N" features determined based upon the output of these multiple algorithms. Experimental testing indicates between 30 and 40 retained features produces sufficient information to create a sufficient plurality of indicia for paper, leather, and some types of documents and document covers. Increasing the number of features identified may not necessarily improve the recognition and resulting robustness of the indicia created. In some implementations, the "top N" features are stored in the device as an initial value.

The "top N" features are used to compute a plurality of indicia values. These features are organized as a linear array, and a position based feature selection algorithm is used, as described above, and by varying offsets and skip increments in the selection from the feature array, a plurality of indicium may be generated from a single feature list. The offset and skip increment used to calculate each indicium value is stored with the each generated indicium in the indicia table for later use (step 14150).

The indicium value(s) created then may be associated to one or more indicium tags and the indicium, indicium parameters, tag/indicium value mappings, tags, tag position, timestamp of indicium creation, etc. are stored as part of the indicia table (14160, 14170).

The key then reads the indicia table and transmits the indicia tag/value list (in the requested external order, which may be the same or different than the order indicia are stored in the indicia table), along with the public cryptographic key (if needed) to the PAMS management server (step 14180), which stores this information for later use (step 14190).

Figure 14B:
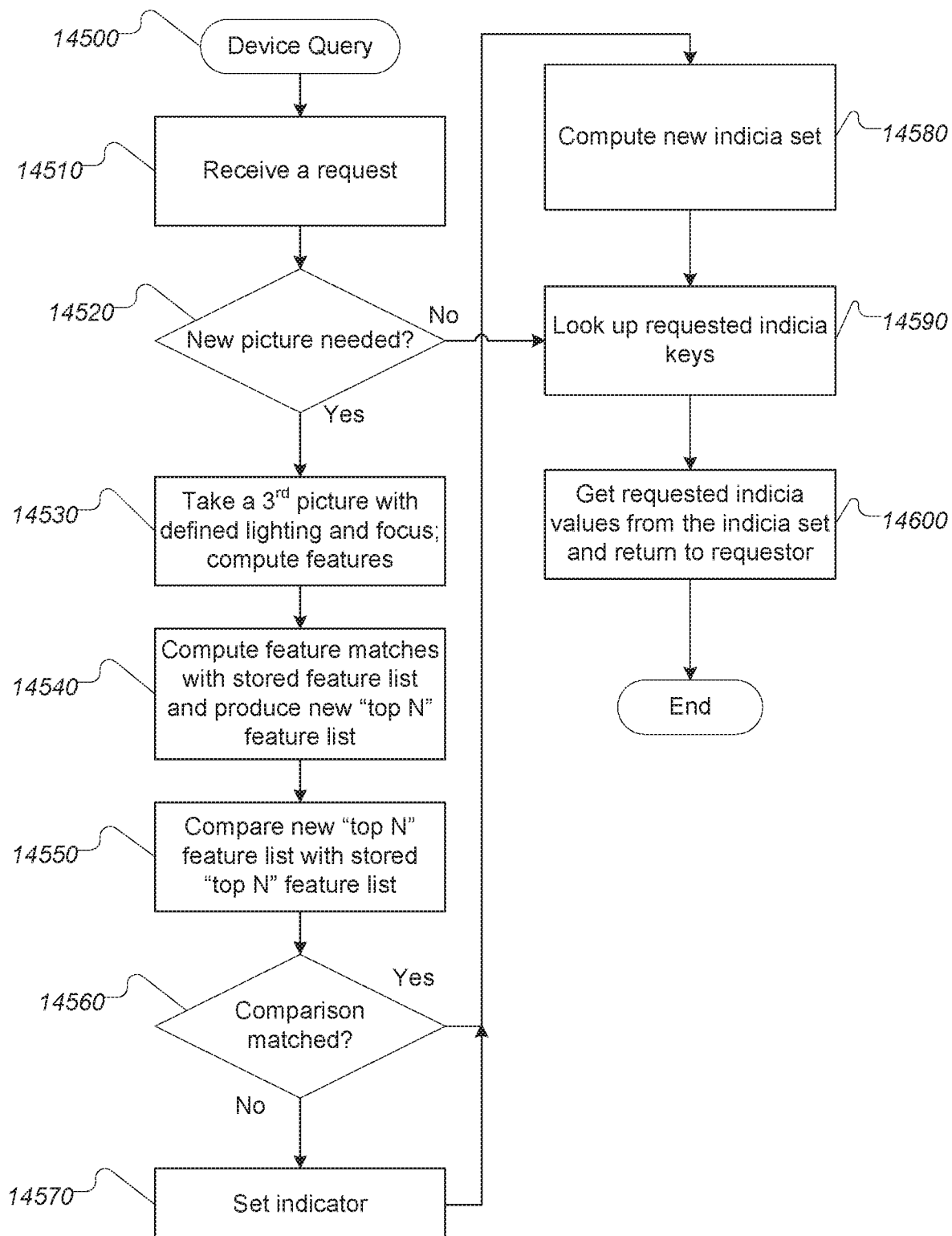
FIG. 14B illustrates an exemplary process for reading an optical sensor key.

An image key responds to a device query requesting the validation of specific indicium tags by returning the corresponding indicia values using a process like that illustrated in FIG. 14B. Alternatively, the key may periodically perform new measurements and transmit them to a PAMS management server without an initial request. Obfuscation techniques such as capturing multiple images with different sensor settings each time an indicium is requested may be included in the final process. A general process for validating the indicia values is as follows:

(a) The device receives a request, which is validated as coming from a known authorized requester (14510). Invalid requests are immediately rejected or ignored. Based upon the request, the key device determines if a new image is needed (based at least in part upon timestamps in the indicia table). If a new image is not required, processing continues at step 14590.

(b) If a new image is required, the key device obtains the sensor setting (parameters) from the previously stored initialization information (in the indicia table), sets the sensor(s) in accordance with these parameters, and obtains a third image from the sensor (step 14530). Features are then determined from the newly acquired image using the specified feature detection algorithms, processed in the same manner as the initial feature lists to determine repeatable features, and a new "top N" repeatable feature list is computed using the third image features (14540). The computed top feature list is matched against the stored top feature list (14550) and test is made for an acceptable match (14560). Note that an acceptable match may not be precisely 1:1, but may occur when some significant percentage of features that match. The acceptability of a particular match is determined based upon the material being measured; the sensor device and setting being used, and the feature detection algorithms and parameters used, If the feature list does not acceptably match and there is an attached indicator, the key device optionally sets the indicator to indicate that the protected article has been tampered with (14570). Using the stored initial values (e.g. private key, starting index, skip value, and other information from the initialization storage and/or the indicia table) and the computed feature list, calculate a new indicia value set and associate the newly calculated indicia set with the appropriate indicia tags. The timestamps of the updated indicium values are updated to the current timestamp [or tick count for key devices that do not have internal clocks] (step 14580). This has the effect of replacing the last seen indicia that are stored in the device and enabling caching of these values. The look up the requested indicia tags (from the initial request) in the indicia table (using the optional indicia index map to further permute the indicia tag index to indicia value) and return the requested indicia (steps 14600, 14610) to the requester.

Creation of an RFID Key

Figure 13:
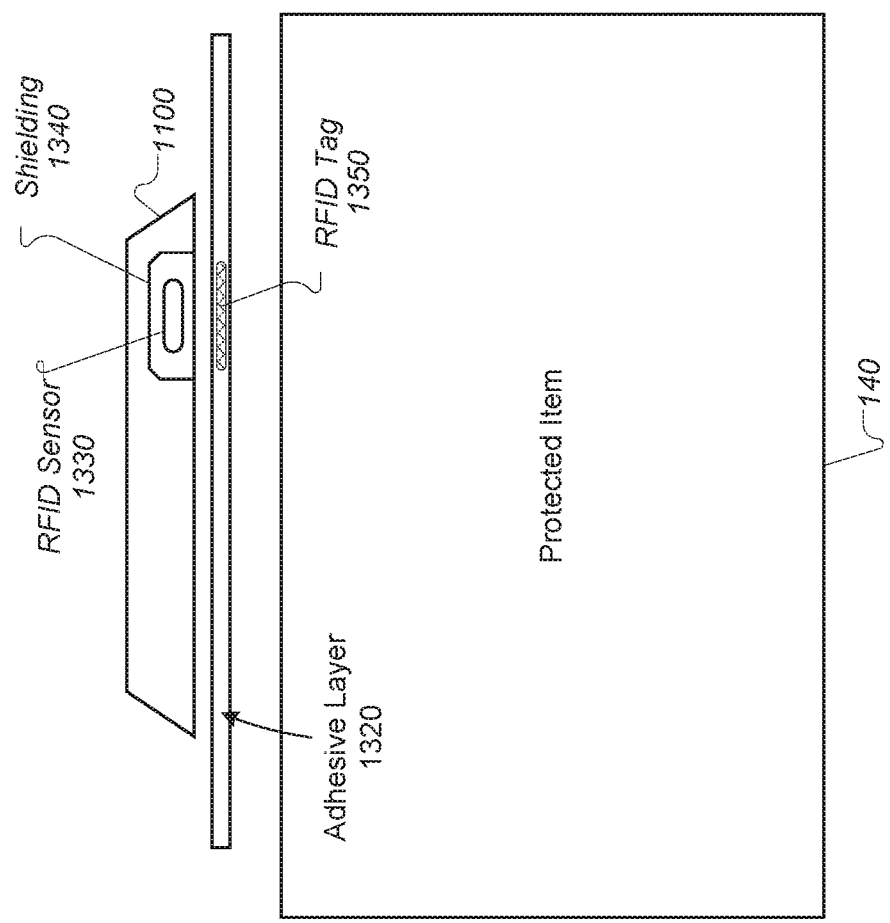
FIG. 13 illustrates an exemplary implementation of an RFID key attached to a protected article.

In an example embodiment illustrated in FIG. 13, the key (1110) is affixed to a protected article (140) that contains an RFID chip. The key is configured with an RFID sensor (13300 and optional protective shielding (1340). The RFID sensor is positioned so it may interrogate the RFID chip using a very low power setting. The shielding blocks external RF signals in order to increase the sensitivity of the RFID sensor and to inhibit spoofing attacks directed at the RFID sensor from outside (interfering) RF sources. In an alternative exemplary embodiment, an RFID chip (1350) may be added to an adhesive layer (1320) that binds the key to the protected article.

The identified features are filtered and the run through an indicia generation algorithm to produce the indicia.

Keys may be constructed using one or more of the above techniques, so a combined resistance, optical, and RFID sensing key may be created.

Use of the System

There are many processes associated with PAMS. Selected key processes are described below.

- Create protected article
- Transportation, distribution, and management of a protected article while it is in the wholesale/presale supply chain
- Sale/Resale of a protected article
- Association of a protected article with one or more communicators
- Periodically interrogate/report/set status of a protected article
- Display the status of a protected article.

Creation of a Protected Article

Figure 6:
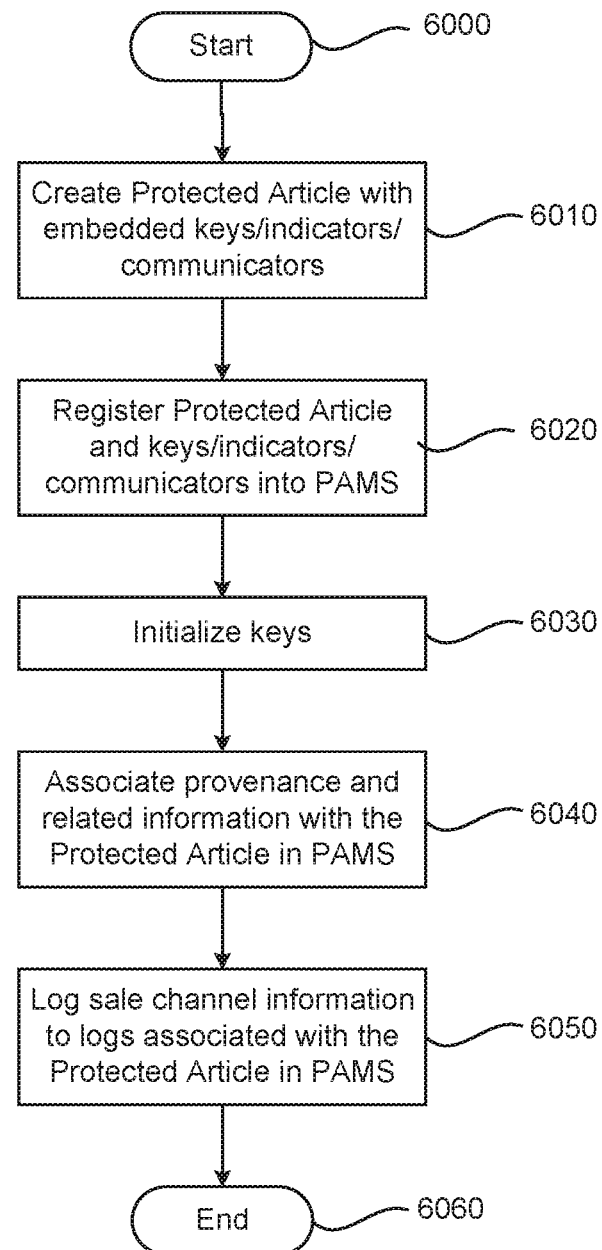
FIG. 6 illustrates an exemplary process flow for creation of a protected article.
Figure 7:
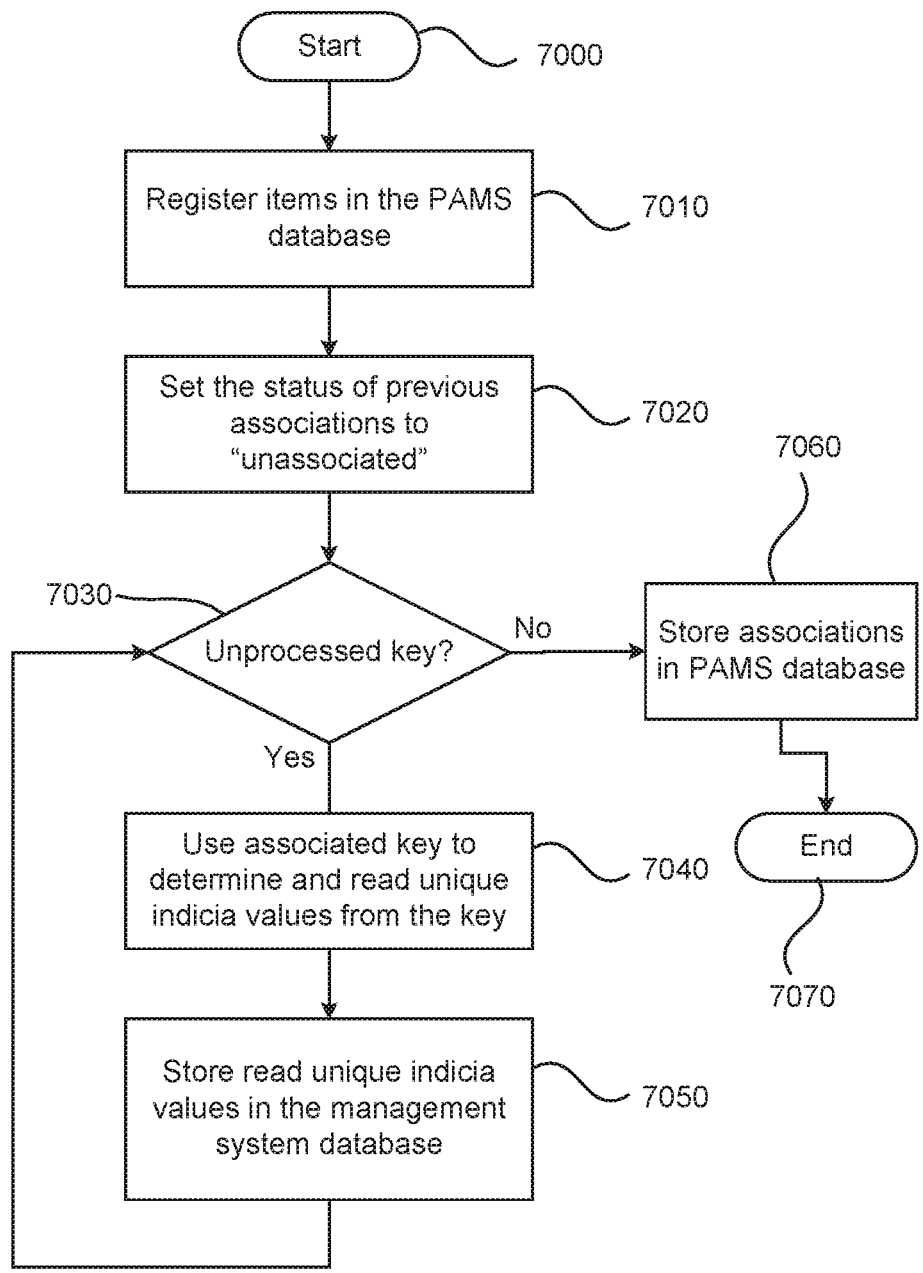
FIG. 7 illustrates an exemplary process flow for the initialization of a protected article/key set.

The process for the creation of a protected article is illustrated in FIG. 6 (process flow 6000) and described below.

1. In step 6010, the protected article is created, with embedding appropriate keys/indicators/communicators into the protected article during the manufacturing process as dictated by the design.
2. Registration of the protected article and its keys, indicators and communicators (if any) into a PAMS server is performed as part of step 6020. Registration includes processes discovering the keys associated with a protected article by interrogation by a communicator at the factory, and for checking the operation of the keys during manufacture.
3. Perform the initialization of the keys (step 6030) (as described below). This step varies based upon the type of each key being initialized.
4. Step 6040 involves the steps of associating provenance and related information with the protected article in the PAMS database. This information may include date/time of creation, the materials and component specifications, brand and model number, values to be displayed on indicators associated with the protected article, etc.
5. Step 6050 includes recording log information into PAMS. This steps includes recording manufacturing and distribution information, as well as first sale information (for factory and/or designer direct sales of protected articles) into the logs associated with the protected article in PAMS.

Initialization of a Key/Communicator

This process describes the initialization of the system using a new key that is part of a protected article. The process is performed during manufacturing when a new protected article is created. Alternatively, key devices may be reinitialized when the protected article is repaired at the factory or at a factory authorized location and the previous indicia values are no longer valid. In some embodiments, a key device may be initialized once for each PAMS server it is in communication with.

1. Step 7010 comprises registering the communicator and protected article ID in the PAMS management server database. If the keys are pre-associated with a protected article ID, register those keys as well.
2. Step 7020 comprises setting the status of the protected article/indicia values to (unassociated), and clearing any previously established communicator/key associations. This step resets any previously established information and logs the reset in the protected article logs.
3. For each key identified (either by association or by discovery), iterate (step 7030) using the key device to determine a set of unique indicium tags and values and reading PUA values associated with these tags from the key device (step 7040), computing the resulting indicia values, and storing these unique indicia in the management system database associated with the key, protected article, and communicator. The update is logged in the protected article logs as well (step 7050).
4. Step 7060 associates the key, protected article, and communicator (if not pre-associated) in the PAMS database.

In particular, for a resistive mesh key, the step of creating the unique values from the key further comprises at least one iteration of the following additional steps:
   a. Selecting at least two electrodes (leads) to measure the electrical characteristics between, and determining the electrical settings to use for each electrode.
   b. Applying a signal comprising a known voltage and amperage to at least a first electrode of the selected set of electrodes
   c. Reading an electrical property (e.g. a voltage) value from a second electrode in the set of electrodes
   d. Repeating steps (a)-(c) for each pair of leads.
   e. Converting at least one of the read electrical property values to an indicia value.

In an alternative embodiment for using a resistive mesh key, the step of creating a time-domain unique value using the key further comprises the following additional steps:

a. Selecting at least two electrodes to measure the electrical characteristics between.
b. Applying a signal comprising a varying (known) voltage and amperage to at least a first electrode of the selected set of electrodes (such as a sin wave)
c. At several time intervals, reading the resulting electrical properties values from a second electrode in the set of electrodes
d. Converting at least one of the time interval and read electrical property value(s) to an indicia value.

Validation of a Protected Article

Figure 8:
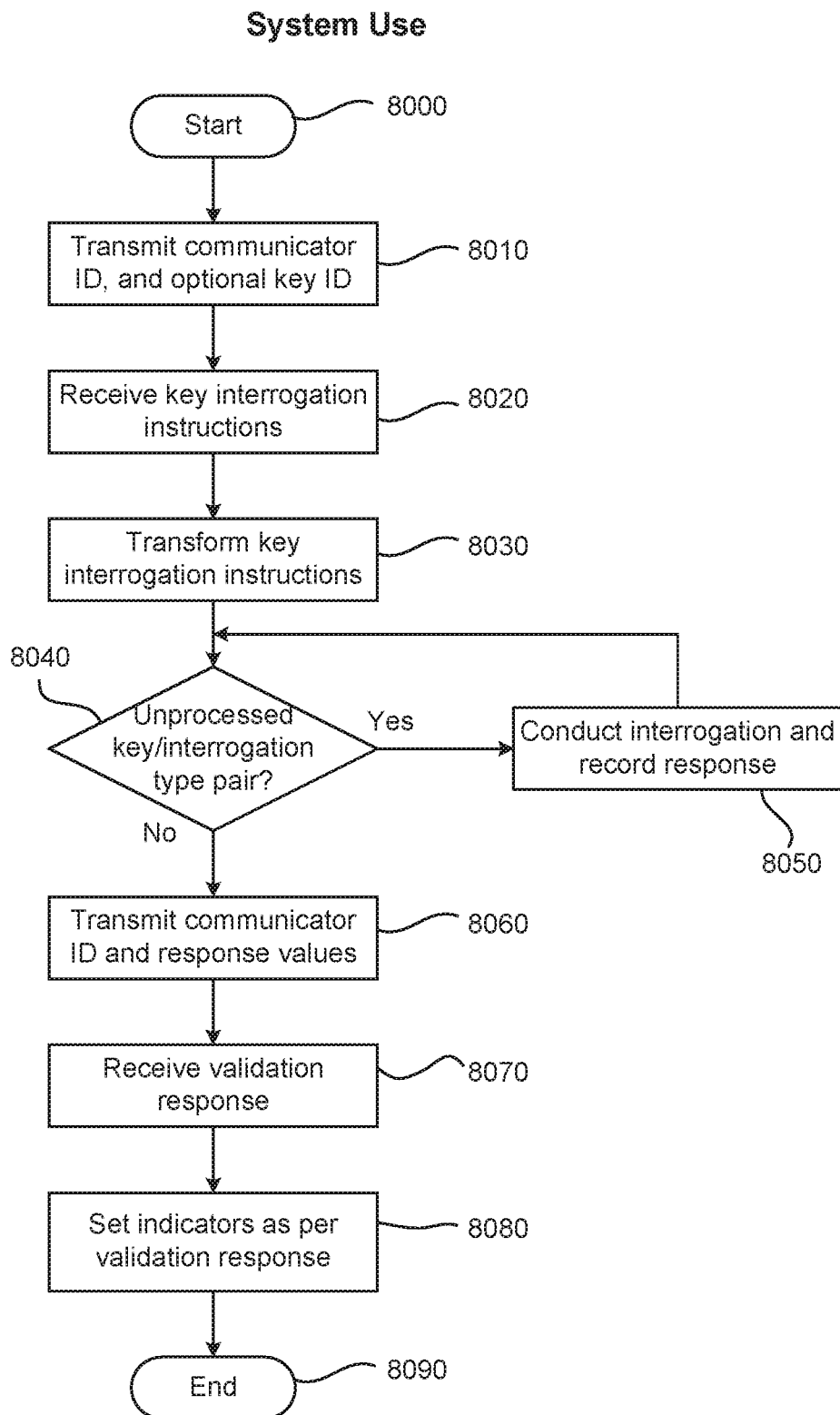
FIG. 8 illustrates an exemplary process flow for validating a protected article.

In the validation of a protected article process, as illustrated in FIG. 8, the system uses one or more key and communicator to validate a protected article with which the key is associated using the following process:

a. In step 8010, the communicator identifies the available key devices of a protected article and transmits from the communicator, the communicator ID, and optionally, one or more of the identified key device IDs to the PAMS management server. Other information, such as GPS and/or location information may also be forwarded to the PAMS management server in this communication.
b. The PAMS management server receives the communicator ID and key IDs, and looks up the associated protected article information. The PAMS management server selects one or more indicia to validate and sends the indicia tags for the desired indicia to the communicator for forwarding to the key(s). The indicia selected may be chosen based upon timestamps, LRU, cached, random selection, or other techniques. A pseudo random number sequence, for example, can be used to specify which subset of indicia tags are selected for a particular validation request. The PAMS server also assigns a transaction ID to this validation (for tracking purposes).
c. In step 8020, receiving, by the communicator, one or more key interrogation instruction from PAMS management server, the key interrogation instructions including the indicium tags for one or more desired indicium. The unique transaction ID may also be received for subsequent use by the communicator. The communicator forwards the requested indicium tags to the key devices(s).

Step 8030 involves the key receiving the key interrogation instructions, looking up a requested indicium tag to determine the sensor and sensor settings to use, transforming the key interrogation instruction to identify pairs of (the type of interrogation to be performed, setting to use to perform the interrogation). Note that a key may be asked for all the indicia values, some of the indicium values, or even a different group of indicium values from one request to the next. In some cases, the key may be asked for non-existent indicium values to check its response (and confuse potential attackers).

Within the key, for each identified (key, indicium tag) pair, iterate the step 8050 of: (a) determining how to interrogate the sensor, (b) conducting the interrogation of the sensor, and (c) record the sensor values/identified features in a defined order or associated with specific sensor settings, and (d) calculate indicium values based upon the newly recorded sensor values/features. The defined order is specified by the PAMS server, and may comprise all or a selected subset of known indicia tags and values, which may be randomly or sequentially ordered. Other interrogations of the sensor may be performed by a key in order to obfuscate the indicia tag to sensor settings mapping. A key queried with a random number that has not been previously registered returns, without complaint, a completely random number.

d. In step 8060, transmit from the key device via a communicator to the PAMS server, the requested indicium response value(s) in requested response order. Optionally transmit the interrogation instructions (for stateless operation of the database), the communicator ID, and/or the transaction ID previously received if required.

e. The PAMS management server calculates the validity of the received information and makes a validity determination regarding the received indicia. The validity determination is made based upon matching one or more of the received indicia against the stored indicia in the PAMS management server. Note that not all received indicia values must be validated by the PAMS server for a validity determination to be made. Some values may be ignored (they were requested for obfuscation purposes) and, in some cases, a small percentage of indicia value mismatches may be permitted (in cases where the feature detection is not completely reliable). The PAMS management server may optionally log the validity determination in the database. In step 8070, the communicator receives a validation response from the PAMS management server.

f. Using the received validation response, the communicator sets one or more indicators associated with the protected article in response to the receipt (or non-receipt) of the validation response and/or its contents in step 8080.

The PAMS management server, upon receiving indicia from a key, compares the indicia to previously stored indicia in the PAMS database. Depending upon the key type and indicia provided, the comparison may not be for an exact match, but might be for "within a specified tolerance" range. For example, a resistive mesh key's indicia may be decoded and compared using a 5% tolerance value.

Affixing an Integrated Device to a Passport

Figure 15:
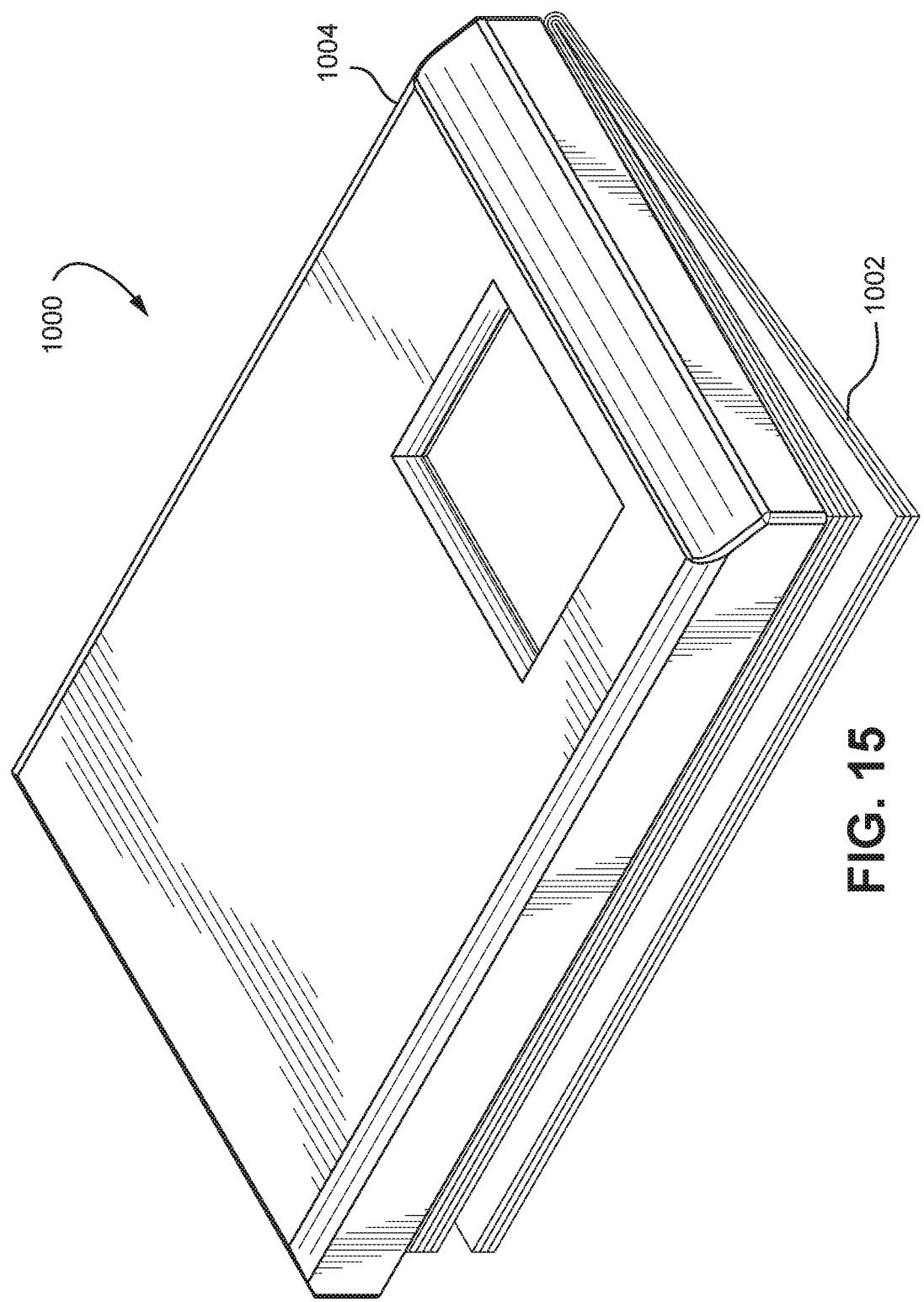
FIG. 15 illustrates an example for using the integrated device 1000 with a customs document.

FIG. 15 illustrates an example for using the integrated device 1000 with a customs document (with any or all of the disclosed sensor modes) to affix the key device 1004 to easily mislaid or stolen official documents, such as a passport 1002. An integrated device 1002 permits the location of the passport 1002 to be determined when it has been separated from the person to whom it is issued and provides a mechanism for tracking stolen or lost passport 1002 before they can be used improperly, and further identifies the document as to its current status. One challenge of using an integrated device 1000 in this way is affixing the key device 1004 to the passport so that it is not easily removable without leaving a trace. Typically, this is accomplished using strong adhesives such as an epoxy. Hard setting adhesives affixed to flexible substrates such as a passport cover often experience issues with bond strength, including the ability to "peel away" the cover from the adhesive, permitting the integrated device to be separated from the passport.

An alternative mechanism is to use a strippable adhesive, which bonds firmly to the passport, and also bonds firmly to the integrated device casing, but has a weaker layer designed to fail when stress is applied. The strippable adhesive, when force is applied, separates at one or more predetermined locations provided by the weaker layer, leaving a first residual portion affixed to the passport and a second residual portion affixed to the integrated device, and part of the weaker portion affixed to each residual portion. Each of the residual portions may change color to a unique (different) color (for example, due to air exposure) or expose a message indicating that the integrated device has been removed as a visual indicator.

More interesting are those mechanisms that permit the integrated device to recognize that the integrated device and the passport have been separated, and for the integrated device to take action, display an indication, and notify the PAMS server that the integrated device and the passport are no longer associated.

In an example implementation, the integrated device may monitor an internal inertial/shock sensor and take an action if shocks greater than a predetermined level occur (e.g. the inertial sensor triggers). This action may include one or more of the following actions: a) display an indication on the integrated device, b) report to the PAMS server, c) take further actions to verify the integrity of the integrated device and passport. For example, the inertial sensor may trigger on shocks greater than 5G or alternatively 25G (or any setting between 5G and 25G). Alternatively, the inertial sensor may trigger if movements of the integrated device consistent with a predetermined pattern are observed. For example, the integrated device may be pre-programmed with inertial movement patterns that are indicative of the twisting and turning of the integrated device being detached from a passport, and be programmed to notify the PAMS server if inertial movements matching a preprogrammed pattern are detected. In an alternative implementation, the integrated device may record the inertial movements and forward information regarding the movements to the PAMS server, where the recorded movement information is matched against one or more patterns to determine if the integrated device is likely being separated from the passport.

In an alternative example implementation, a conductive adhesive layer is used, and the integrated device monitors one or more electrical characteristics of the adhesive layer. In an embodiment, the adhesive layer is variably electrically conductive, and the integrated device has measuring pins or leads inserted into the adhesive layer. If the electrical characteristics of the adhesive layer change by more than a specified amount, the integrated device takes an action as described above. In some implementations, the adhesive layer may have fine electrical wires embedded within it. This is particularly useful when using a strippable adhesive layer and causing the wires to cross the relatively weaker interface layer. Separating the adhesive layers causes the wires to stretch and/or break, changing their electrical characteristics. Again, if the electrical characteristics of the wires embedded within the adhesive layer change by more than a specified amount, the integrated device takes an action as described above.

In a last example implementation, the integrated device is fitted with a passport facing sensor and optional light, where the sensor provides an image (for example, visible, UV, or IR illuminated) of a portion of the passport. Feature analysis algorithms are then used on the image to determine unique features of the image as described above. If there are changes to the features (or changes above a certain percentage of the features), the integrated device takes an action as described above. In alternative implementations, the features detected may be printed on the passport during initialization or may be PUAs present in the passport at time of initialization. Note that the feature analysis and comparison may be performed by the integrated device. In alternative embodiments, an image may be uploaded to the PAMS server and the analysis and comparison performed there.

In an additional illustrative, non-limiting example, a set of keys and indicators may be integrated into an article container such as a courier bag used to transfer high value documents used in complex international financial transactions. Generally, there are assurances regarding the authenticity and provenance of these documents. Using a protected article courier bag or other container addresses protecting these documents while they are in transit. In such a protected article courier bag, a first key is configured to measure PUAs related to the integrity of the courier bag itself and a second key is configured to measure PUAs related to the integrity of the courier bag closure. In indicator and communicator may be optionally integrated, or may be used independently.

In this example, the integrity of the courier bag itself is measured using a variably conductive lining of the bag, the conductivity of which is measured at various points within the bag by a resistive mesh key. The bonding between the keys and the courier bag are also monitored if the keys are affixed in a location that can be accessed without triggering other tamper detection aspects of the courier bag. Changes in the electrical characteristics of the courier bag indicate that the bag's lining has been tampered with. A second key measures the integrity of the bag's closure mechanism, and in particular, whether the seal applied to the closure remains intact.

A bag seal may be constructed using a variably conductive adhesive, a tape using a variably conductive adhesive, a conductive wire interlaced into a seal produced using traditional sealing techniques (any of which may have their PUAs measured and monitored by a resistive mesh key or an optical key), or by using traditional sealing techniques for which the PUA are measured and monitored by an optical key.

During use, the courier bag is loaded with the documents to be protected, the bag is sealed, and the keys are initialized and registered with PAMS. By initializing the keys each time the bag is sealed, new indicia are created, eliminating attacks based upon prior usage of the bag and how its indicia change when the bag is opened. The bag is transported to its end destination. Periodically during transport, and upon receipt at its end destination, the integrity of the bag and seals are checked by instructing the keys integrated into the bag to read the PUA of the bag and seal, determine the indicia for the bag, and transmit this indicia to the PAMS server. The server checks the received indicia against the previously stored indicia provided during key initialization, and if they match, the bag may be inferred to be not tampered with. If an indicia mismatch indicates that the bag has been tampered with, an indicator associated with the bag may be set to indicate its status. The communicator used to communicate between the keys and the PAMS server may be integrated into the bag along with the keys (e.g. an integrated device) or may be a separate device that communicates with the keys at each of the bags sender, receiver, and in-transit locations.

If the integrity of the bag and/or its seal is in question (e.g. the keys indicate tampering), a new set of documents is dispatched and the tampered with bag and documents are not used. If the indicia indicate that the bag has not been tampered with, the receiver of the courier bag (and its enclosed documents) has assurance that the documents have not been substituted or tampered with.

In a further exemplary non-limiting embodiment, keys may be embedded within and/or affixed to art objects, ranging from wall hangings, pictures (such as original oil paintings), and embedded within three dimensional artwork such as sculptures. In an example, an optical key (or an integrated communicator/optical key device) may be affixed to the back of an original painting in a way that it measures a portion of the painting canvas or other painting substrate, and reports if the key has been detached or tampered with. A resistance key may be used measure the PUA of a statue into which it is mounted (or measure the resistance of the mounting adhesive) and report if the key has been detached or tampered with.

In a final illustrative, non-limiting example, an RFID and resistance mesh key may be embedded in a fashion wristwatch in order to validate the watch. The RFID key measures the presence of an RFID tag integrated within the wristwatch body, while the resistance key mesh measures PUA associated with the integrity and structure of the wristwatches case. In this way, the two keys cooperate to protect the RFID tag within the watch from substitution attacks and validate that the manufacturers watch assembly has not been tampered with. The keys are initialized and registered into a manufacturer's PAMS server at the time of manufacture. The combination of these two keys both continuing to produce the correct (e.g. manufacturers) indicia are evidence that the watch has not been tampered with since manufacture. Failures of one or both of the keys are indications that watch may have been tampered with or may be a forgery. Repairs and or servicing at an authorized repair center reset the indicia requiring reregistration and an updating of the provenance of the wristwatch (e.g. that it has been repaired and/or serviced.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An authentication component for use with an article comprising at least one physically uncopiable attribute of the material of manufacture of the article, the attribute being independent of the authentication component, the authentication component comprising:
  a sensor that measures the at least one physically uncopiable attribute of the material of manufacture of the article and produces a corresponding measurement signal that changes when the authentication component is moved relative to the material of manufacture of the article exhibiting the at least one physically uncopiable attribute, and
  an authentication circuit connected to the sensor and configured to calculate at least one authenticity indium based on the measurement signal the sensor produces in response to measuring the at least one physically uncopiable attribute of the material of manufacture of the article, and to provide the calculated authenticity indicia.

2. The authentication component of claim 1 wherein the authentication component is separate from the article, is not the article and is removably attachable to and detachable from the article.

3. The authentication component of claim 1 wherein the at least one physically uncopiable attribute is a characteristic of material of manufacture of the article comprising at least one of fabric, leather, carbon fiber, metal or any combination thereof.

4. The authentication component of claim 1 wherein the authentication component sensor is configured to measure electrical resistance of the at least one physically uncopiable attribute of the article.

5. The authentication component of claim 1 where the at least one authenticity indicium is unique to the article.

6. The authentication component of claim 1 wherein the at least one physically uncopiable attribute of the article is immutably bound to the article and detachment of the authentication component from the article causes a change in the calculated authenticity indicia.

7. The authentication component of claim 1 wherein the at least one physically uncopiable attribute of the article is immutably bound to the article and the authentication component may not be detached from the article without causing a change in measuring the physically uncopiable attribute.

8. The authentication component of claim 1 wherein the material of manufacture of the article forms a structural aspect of the article.

9. The authentication component of claim 1 wherein the material of manufacture of the article provides a decorative aspect of the article.

10. The authentication component of claim 1 wherein the material of manufacture of the article provides at least one functional aspect of the article that is unrelated to authentication.

11. The authentication component of claim 1 wherein the physically uncopiable attribute of the article is intrinsic to the material of manufacture of the article.

12. The authentication component of claim 1 wherein the authentication circuit comprises a cryptographic element structured to receive the sensed physically uncopiable attribute(s) from the sensor and derive the at least one authentication indicium comprising at least one cryptographic key based on the sensed physically uncopiable attribute(s).

13. The authentication component of claim 1 wherein the authentication component further comprises a wireless communication device.

14. The authentication component of claim 1 wherein the sensor comprises at least one of an electrical resistance sensor and an optical sensor, the sensor detecting the physically uncopiable attribute that is intrinsic to the article and is difficult to change or duplicate.

15. The authentication component of claim 1 wherein the material of manufacture consists of fabric, leather, a polymer, carbon fiber, metal or any combination thereof.

16. The authentication component of claim 1 wherein the authentication circuit is configured to derive or obtain, based on the measurement signal, at least one cryptographic key corresponding to the at least one physically uncopiable attribute.

17. A protected article comprising in combination:
  a material of manufacture having at least one inherent, physically uncopiable attribute or property, wherein removal of the material of manufacture from the protected article will devalue the article, and
  an authentication component that is placed in or on the article, the authentication component not carrying the material of manufacture or the physically uncopiable attribute or property, the authentication component comprising:
    a sensor configured to measure the inherent, physically uncopiable attribute or property of the material of manufacture and produce a corresponding measurement signal that changes when the authentication component is moved relative to the material of manufacture having the at least one inherent, physically uncopiable attribute or property, and
    a controller connected to the sensor, the controller configured to calculate at least one authenticity indicium based on a cryptographic key derived from the measurement signal indicating a measurement of the inherent, physically uncopiable attribute or property of the material of manufacture, the at least one cryptographic key changing when the sensor is moved relative to the material of manufacture.

18. The protected article of claim 17 wherein the substrate comprises at least one of fabric, leather, a polymer, carbon fiber and metal, and the sensor optically measures the inherent, physically uncopiable attribute or property of the fabric, the leather, the polymer, the carbon fiber or metal.

19. The protected article of claim 17, wherein the article comprises a fashion article or comprises a custom document.

20. A fashion apparel or accessory comprising:
  a fashionable body comprising a material of manufacture attached to, part of or inherently part of the fashionable body, the material of manufacture having at least one inherent, physically uncopiable attribute or property, the fashionable body and/or material of manufacture being structured so that removal of the material of manufacture from the fashionable body will damage the fashionable body and/or the material of manufacture, and
  an authentication chip disposed on the fashionable body, the material of manufacture forming no part of the authentication chip, the authentication chip comprising:
    a sensor configured to sense the inherent, physically uncopiable attribute or property of the material of manufacture and provide a sensing output that changes when the sensor is moved relative to the material of manufacture, and
    a controller connected to the sensor and configured to calculate authenticity indicia based on a cryptographic key derived from the sensed output corresponding to the inherent, physically uncopiable attribute or property of the material of manufacture and to wirelessly transmit the authenticity indicia.

* * * * *